(12) United States Patent
Choi et al.

(10) Patent No.: US 11,360,589 B2
(45) Date of Patent: Jun. 14, 2022

(54) ELECTRONIC DEVICE INCLUDING FLEXIBLE DISPLAY AND METHOD OF OPERATING SAME

(71) Applicant: SAMSUNG ELECTRONICS CO., LTD., Suwon-si (KR)

(72) Inventors: Yangsoo Choi, Suwon-si (KR); Youngseong Kim, Suwon-si (KR); Gyeongtae Park, Suwon-si (KR); Jookwan Lee, Suwon-si (KR); Jihea Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/226,355

(22) Filed: Apr. 9, 2021

(65) Prior Publication Data

US 2022/0155889 A1 May 19, 2022

(30) Foreign Application Priority Data

Nov. 16, 2020 (KR) .......................... 10-2020-0153022
Nov. 23, 2020 (KR) .......................... 10-2020-0157299

(51) Int. Cl.
*G06F 3/041* (2006.01)
*G06F 1/16* (2006.01)

(52) U.S. Cl.
CPC ............ *G06F 3/041* (2013.01); *G06F 1/1643* (2013.01); *G06F 1/1652* (2013.01); *G06F 2203/04102* (2013.01); *G06F 2203/04105* (2013.01)

(58) Field of Classification Search
CPC ...... G06F 3/041; G06F 1/1643; G06F 1/1652; G06F 2203/04102; G06F 2203/04105
See application file for complete search history.

(56) References Cited

U.S. PATENT DOCUMENTS

2014/0004906 A1 1/2014 Chi et al.
2018/0039302 A1 2/2018 Levesque et al.
(Continued)

FOREIGN PATENT DOCUMENTS

KR 10-2011-0025722 3/2011
KR 10-2014-0003132 1/2014
(Continued)

OTHER PUBLICATIONS

Office Action for KR 10-2020-0157299 dated Feb. 3, 2021, with English Translation.
(Continued)

*Primary Examiner* — Amare Mengistu
*Assistant Examiner* — Gloryvid Figueroa-Gibson
(74) *Attorney, Agent, or Firm* — Nixon & Vanderhye, P.C.

(57) ABSTRACT

An electronic device according to various embodiments may include: a first structure comprising a reciprocating housing; a second structure including a guide configured to guide sliding movement of the first structure; a flexible display configured to be at least partially inserted inside the second structure or visible to an outside of the second structure by the sliding movement of the first structure; at least one sensor; and at least one processor operatively connected to the flexible display and the at least one sensor, wherein the at least one processor may be configured to: detect a touch on the flexible display through the at least one sensor, detect pressure of the touch through the at least one sensor, determine whether a direction in which the touch moves corresponds to a direction in which the first structure is capable of sliding, based on determining that the direction in which the touch moves corresponds to the direction in which the first structure is capable of sliding, determine whether a change in the detected pressure satisfies a specified condi-
(Continued)

tion, based on determining that the change in the detected pressure satisfies the specified condition, control an operation for the sliding movement of the first structure based on a change in the detected pressure, and based on determining that the change in the detected pressure does not satisfy the specified condition, execute a function of an application corresponding to the touch.

20 Claims, 13 Drawing Sheets

(56) References Cited

U.S. PATENT DOCUMENTS

| | | | |
|---|---|---|---|
| 2019/0268455 A1 | 8/2019 | Baek et al. | |
| 2019/0317550 A1 | 10/2019 | Kim et al. | |
| 2020/0026331 A1 | 1/2020 | Levesque et al. | |
| 2020/0363841 A1 | 11/2020 | Kim et al. | |
| 2021/0064207 A1 | 3/2021 | Kim et al. | |
| 2021/0072796 A1* | 3/2021 | Kim | G09G 3/2092 |

FOREIGN PATENT DOCUMENTS

| | | |
|---|---|---|
| KR | 10-2017-0083404 | 7/2017 |
| KR | 10-2018-0015087 | 2/2018 |
| KR | 10-2019-0062855 | 6/2019 |
| KR | 10-2019-0101605 | 9/2019 |
| KR | 10-2019-0111623 | 10/2019 |
| KR | 10-2019-0119719 | 10/2019 |
| KR | 10-2019-0124009 | 11/2019 |
| KR | 10-2020-0052679 | 5/2020 |

OTHER PUBLICATIONS

Decision of Grant dated Jun. 14, 2021 in corresponding Korean Application No. 10-2020-0157299 (with translation).

* cited by examiner

ELECTRONIC DEVICE INCLUDING FLEXIBLE DISPLAY AND METHOD OF OPERATING SAME

CROSS-REFERENCE TO RELATED APPLICATIONS

This application is based on and claims priority under 35 U.S.C. § 119 to Korean Patent Application No. 10-2020-0153022, filed on Nov. 16, 2020, and Korean Patent Application No. 10-2020-0157299, filed on Nov. 23, 2020, in the Korean Intellectual Property Office, the disclosures of which are incorporated by reference herein in their entireties.

BACKGROUND

Field

The disclosure relates to an electronic device including a flexible display and a method of operating the same.

Description of Related Art

As demand for mobile communication increases and the degree of integration increases in electronic devices, portability of an electronic device such as a mobile communication terminal and convenience in use of multimedia functions may be improved. For example, a display incorporating a touch screen function may replace a mechanical (button type) keypad, thereby miniaturizing the electronic device while maintaining the function of an input device. For example, removal of the mechanical keypad from the electronic device may improve portability of the electronic device. For example, if a display is extended by the area from which the mechanical keypad is removed, the electronic device including the touch screen function is able to provide a larger screen than the electronic device including the mechanical keypad even if it has the same size and weight as the electronic device including the mechanical keypad.

When surfing the web or using a multimedia function, it may be more convenient to use an electronic device that provides a larger screen. Although a larger display is able to be mounted to an electronic device in order to provide a larger screen, there may be limitations in expanding the size of the display in consideration of the portability of the electronic device. In an embodiment, a display using organic light-emitting diodes may secure the portability of the electronic device while providing a larger screen. For example, the display using organic light-emitting diodes (or an electronic device equipped with the same) may stably operate even if it is made quite thin, so it may be mounted to the electronic device in a foldable (or bendable), slidable, or rollable form.

In an electronic device including a flexible display (e.g., a slidable display) in which the area visually exposed to the outside is expandable, the area of the flexible display may be extended on the basis of a physical key input by a user. In the case where the electronic device includes a physical key for expanding the area, it may be inconvenient for the user to grip the electronic device depending on the mounting position of the physical key, and the space required for mounting the physical key may limit the design of the electronic device. In addition, when using a physical key for expanding the area of the flexible display, it may be difficult for the user to expand the area of the flexible display using only one hand.

SUMMARY

Embodiments of the disclosure provide an electronic device including a flexible display in which the area visually exposed to the outside of the flexible display is expandable by touching the flexible display and capable of distinguishing between a touch for expanding the area and a touch for executing an application function, and further relate to a method of operating the electronic device.

The aspects, features and advantages of the disclosure are not limited to those mentioned above, and other aspects, features and advantages that are not mentioned herein may be clearly understood by those skilled in the art to which the disclosure pertains.

An electronic device according to various example embodiments may include: a first structure including a reciprocating housing; a second structure including a guide configured to guide sliding movement of the first structure; a flexible display configured to be at least partially inserted inside the second structure or visible to an outside of the second structure based on the sliding movement of the first structure; at least one sensor; and at least one processor operatively connected to the flexible display and the at least one sensor, wherein the at least one processor may be configured to: detect a touch on the flexible display through the at least one sensor, detect pressure of the touch through the at least one sensor, determine whether a direction in which the touch moves corresponds to a direction in which the first structure is capable of sliding, based on determining that the direction in which the touch moves corresponds to the direction in which the first structure is capable of sliding, determine whether a change in the detected pressure satisfies a specified condition, based on determining that the change in the detected pressure satisfies the specified condition, control an operation for the sliding movement of the first structure based on a change in the detected pressure, and based on determining that the change in the detected pressure does not satisfy the specified condition, execute a function of an application corresponding to the touch.

A method of operating an electronic device according to various example embodiments may include: detecting a touch on a flexible display through at least one sensor of an electronic device including a first structure comprising a reciprocating housing, a second structure including a guide configured to guide sliding movement of the first structure, the flexible display configured to be at least partially inserted inside the second structure or visible to an outside of the second structure by the sliding movement of the first structure, and at least one sensor; detecting pressure of the touch through the at least one sensor; determining whether a direction in which the touch moves corresponds to a direction in which the first structure is capable of sliding; based on the direction in which the touch moves corresponding to the direction in which the first structure is capable of sliding, determining whether a change in the detected pressure satisfies a specified condition; based on determining that the change in the detected pressure satisfies the specified condition, controlling an operation for the sliding movement of the first structure based on a change in the detected pressure; and based on determining that the change in the detected pressure does not satisfy the specified condition, executing a function of an application corresponding to the touch.

An electronic device including a flexible display in which the area visible to the outside of the flexible display is expandable by touching the flexible display and a method of operating the same according to various example embodiments make it possible to distinguish between a touch for expanding the area and a touch for executing an application function, thereby enabling the user to perform an accurate operation using one hand.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
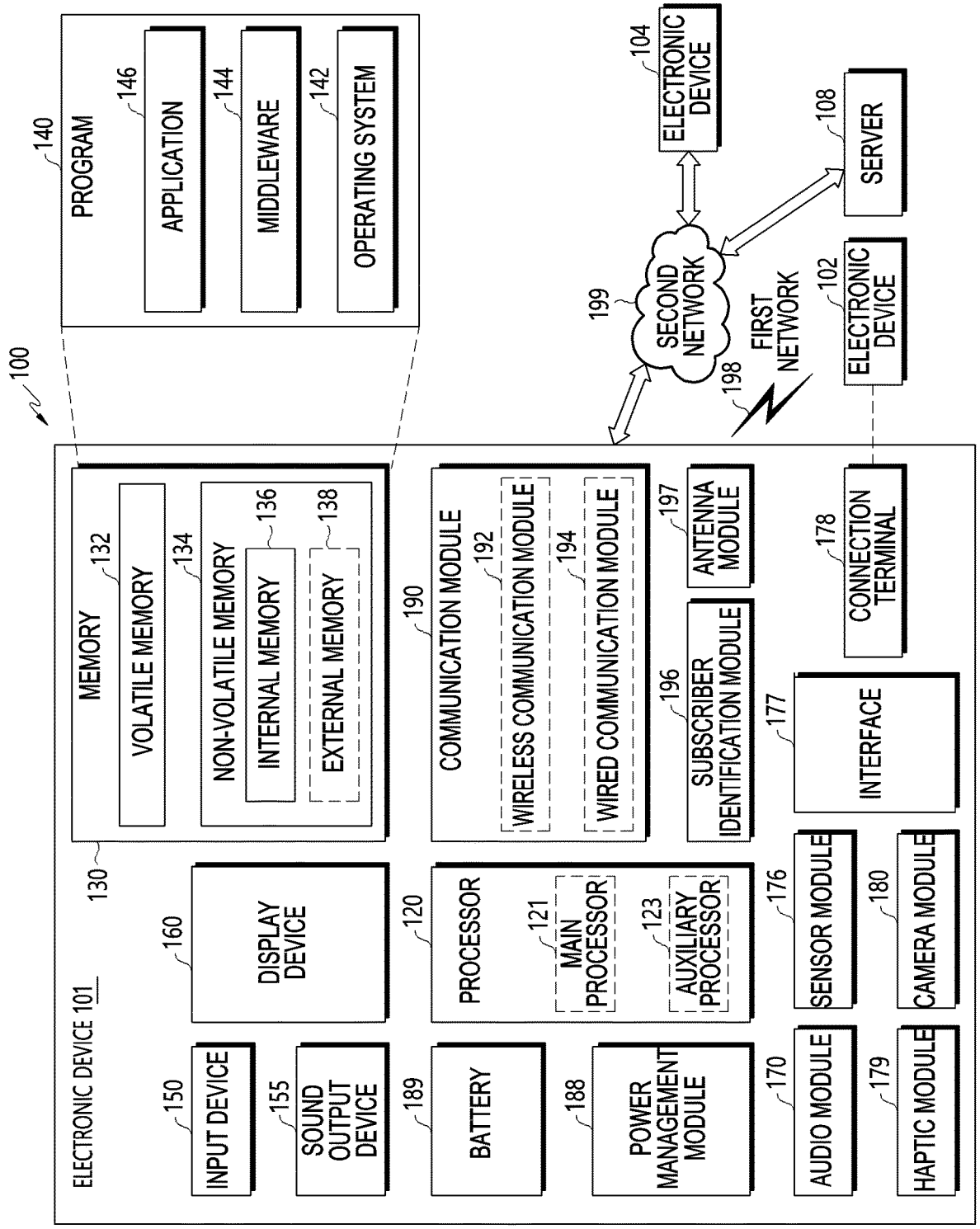
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
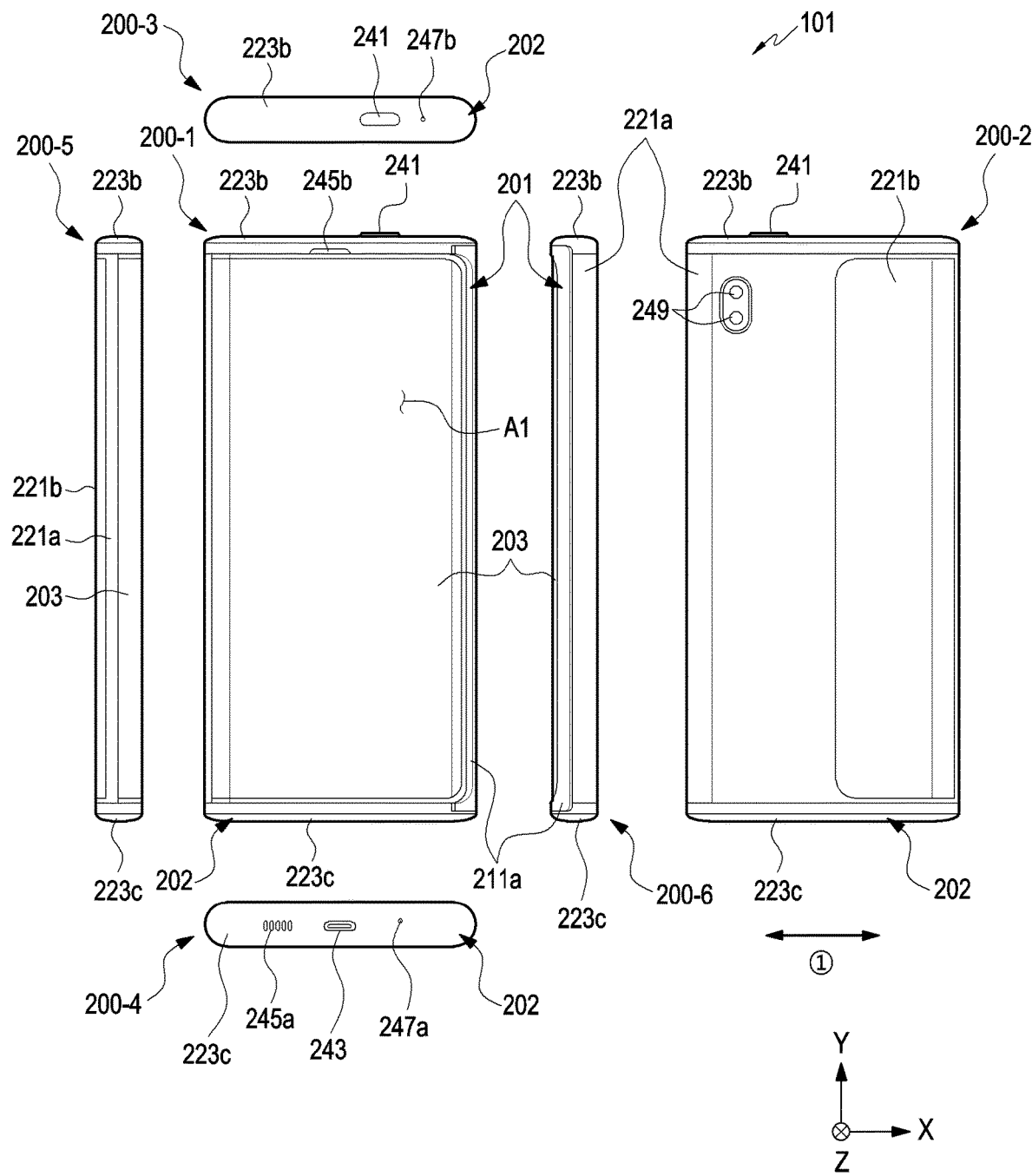
FIG. 2A is a diagram illustrating an example of a state in which a portion of a flexible display is received inside a second structure according to various embodiments.

FIG. 2A is a diagram illustrating an example of a state in which a portion of a flexible display is received inside a second structure according to various embodiments.

Figure 2B:
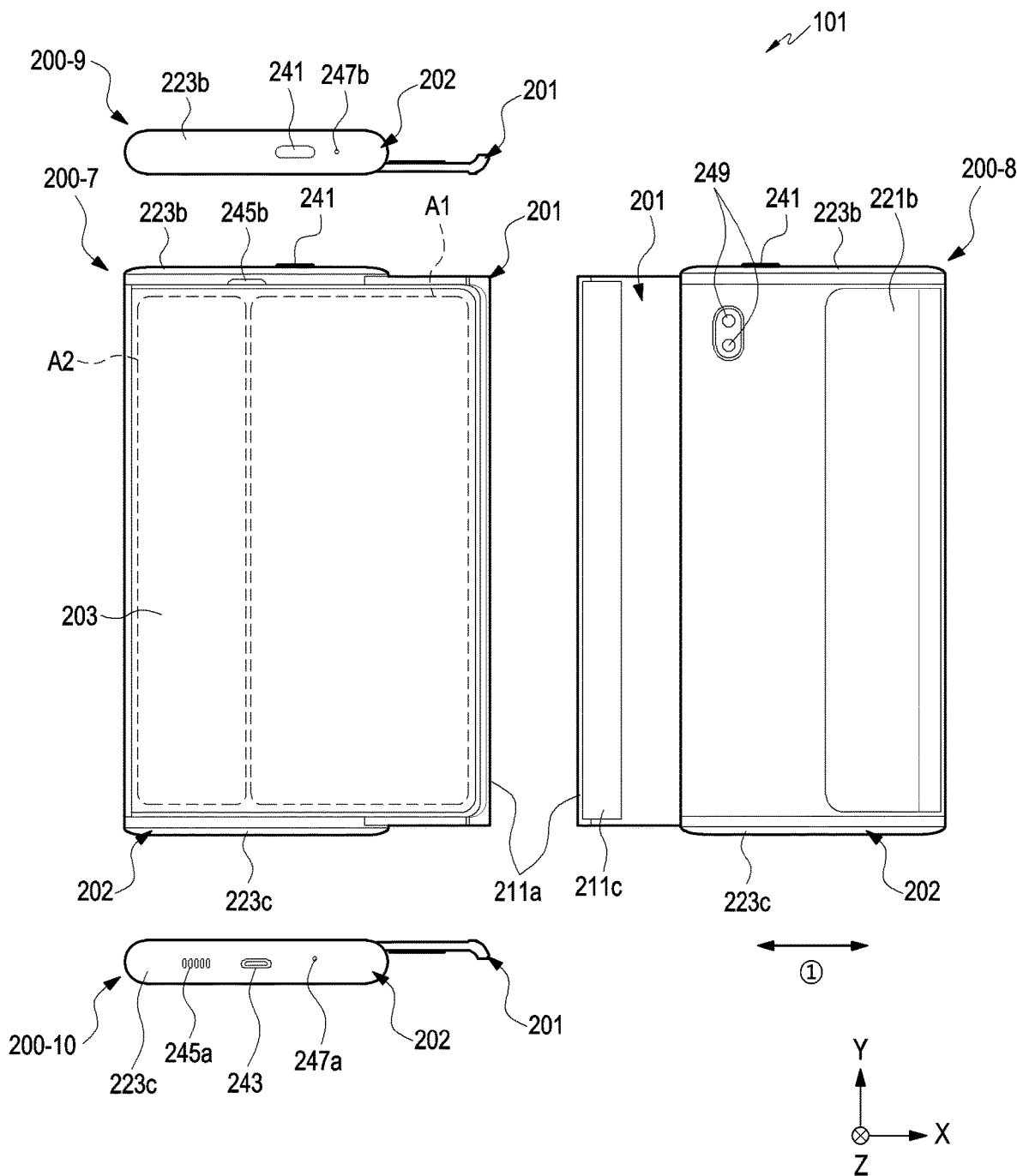
FIG. 2B is a diagram illustrating an example of a state in which most of a flexible display is exposed to the outside of a second structure according to various embodiments.

FIG. 2B is a diagram illustrating an example of a state in which a portion of a flexible display is exposed to the outside of a second structure according to various embodiments.

The state shown in FIG. 2A may be the state in which the first structure 201 is closed with respect to the second structure 202, and the state shown in FIG. 2B may be the state in which the first structure 201 is open with respect to the second structure 202. Depending on the embodiment, a "closed state" or an "open state" may be the state in which the electronic device 101 is closed or open.

Referring to FIGS. 2A and 2B, FIG. 2A may show a front view 200-1, a rear view 200-2, a plan view 200-3, a bottom view 200-4, a left side view 200-5, and a right side view 200-6 of the electronic device 101 in the closed state, and FIG. 2B may show a front view 200-7, a rear view 200-8, a plan view 200-9, and a bottom view 200-10 of the electronic device 101 in the open state.

The electronic device 101 may include a first structure 201 and a second structure 202 disposed to be movable with respect to the first structure 201. In various embodiments, as the second structure may include a structure in which the first structure 201 is disposed to be slidable on the second structure 202 in the electronic device 101. According to an embodiment, the first structure 201 may be disposed to enable reciprocating motion by a predetermined distance in the direction indicated by an arrow ① (for example, the X-axis direction in the front view 200-1 of the electronic device 101 in the closed state or the −X-axis direction in the front view 200-7 of the electronic device 101 in the open state) with respect to the second structure 202.

According to various embodiments, the first structure 201 may be, for example, a first housing, a slide part, or a slide housing, and may be disposed on the second structure 202 so as to reciprocate. In an embodiment, the second structure 202 may be, for example, a second housing, a main part, or a main housing, and may accommodate various electric components or electronic components, such as a main circuit board or a battery. A portion (e.g., a first area A1) of the display 203 may be placed on the first structure 201. In some embodiments, the other portion (e.g., a second area A2) of the display 203 may be inserted inside the second structure 202 (e.g., a slide-in operation), or may be exposed to the outside of the second structure 102 (e.g., a slide-out operation) as the first structure 201 moves relative to the second structure 202 (e.g., sliding movement).

According to various embodiments, the first structure 201 may include a first plate 211*a* (e.g., a slide plate), and may include a first surface (e.g., a front surface) formed to include at least a portion of the first plate 211*a* and a second surface (e.g., a rear surface) facing in the opposite direction of the first surface. According to an embodiment, the second structure 202 may include a second plate 221*a* (e.g., a rear case), a first side wall 223*a* extending from the second plate 221*a*, a second side wall 223*b* extending from the first side wall 223*a* and the second plate 221*a*, a third side wall 223*c* extending from the first side wall 223*a* and the second plate 221*a* so as to be parallel to the second side wall 223*b*, and/or a rear plate 221*b* (e.g., a rear window). In some embodiments, the second side wall 223*b* and the third side wall 223*c* may be formed to be perpendicular to the first side wall 223*a*. According to an embodiment, the second plate 221*a*, the first side wall 223*a*, the second side wall 223*b*, and the third side wall 223*c* may be formed to be open at one side (e.g., the front surface) so as to accommodate (or surround) at least a portion of the first structure 201. For example, the first structure 201 may be coupled to the second structure 202 such that at least a portion thereof is surrounded, and may slide in the direction, for example, in the direction of arrow ①, parallel to the first surface (e.g., the front surface)

or the second surface (e.g., the rear surface) while being guided by the second structure 202.

According to various embodiments, the second side wall 223b or the third side wall 223c may be omitted. According to an embodiment, the second plate 221a, the first side wall 223a, the second side wall 223b, and/or the third side wall 223c may be formed as separate structures, and may be coupled or assembled to each other. The rear plate 221b may be coupled to surround at least a portion of the second plate 221a. In some embodiments, the rear plate 221b may be formed to be substantially integral with the second plate 221a. According to an embodiment, the second plate 221a or the rear plate 221b may cover at least a portion of the flexible display 203. For example, at least a portion of the flexible display 203 may be inserted inside the second structure 202, and the second plate 221a or the rear plate 221b may cover the portion of the flexible display 203, which is inserted inside the second structure 202.

According to various embodiments, the first structure 201 may move in a first direction (e.g., the direction ①) parallel to the second plate 221a (e.g., the rear case) and the second side wall 223b so as to enter the open state and the closed state with respect to the second structure 202, and the first structure 201 may move to the position at a first distance from the first side wall 223a in the closed state and the position at a second distance, which is greater than the first distance, from the first side wall 223a in the open state. In some embodiments, the first structure 201 may be positioned to surround a portion of the first side wall 223a in the closed state.

According to various embodiments, the electronic device 101 may include a display 203, a key input device 241, a connector hole 243, audio modules 245a, 245b, 247a, and 247b, or a camera module 249. Although not shown, the electronic device 101 may further include an indicator (e.g., an LED device) or various sensor modules.

According to various embodiments, the display 203 may include a first area A1 and a second area A2. In an embodiment, the first area A1 may be disposed in the first surface so as to extend across substantially at least a portion of the first surface. The second area A2 may extend from the first area A1, and may be inserted into or received inside the second structure 202 (e.g., the housing), or may be exposed to the outside of the second structure 202 according to the sliding movement of the first structure 201. The second area A2 may substantially move while being guided by a roller (not shown) mounted to the second structure 202 so as to be inserted inside the second structure 202 or exposed to the outside thereof. For example, a portion of the second area A2 may be deformed into a curved shape at a position corresponding to the roller while the first structure 201 is sliding.

According to various embodiments, when viewed from the top of the first plate 211a (e.g., a slide plate), as the first structure 201 moves from the closed state to the open state, the second area A2 may be gradually exposed to the outside of the second structure 202, thereby forming a substantially flat plane together with the first area A1. The display 203 may be connected to a touch sensing circuit, a pressure sensor capable of measuring the intensity (pressure) of a touch, and/or a digitizer for detecting a magnetic-field type stylus, or may be disposed adjacent thereto. In an embodiment, in the case where the stylus is used as an input device (e.g., when a touch input by the stylus is detected in the electronic device 101), the stylus may detect the pressure of a touch by the stylus. The stylus may transmit the detected pressure of the touch to the electronic device 101 through a communication circuit included in the stylus.

In an embodiment, at least a portion of the second area A2 may be inserted inside the second structure 202, and a portion of the second area A2 may be exposed to the outside even in the state shown in FIG. 2A (e.g., in the closed state). In some embodiments, irrespective of the closed state or the open state, a portion of the exposed second area A2 may be positioned on the roller (not shown), and a portion of the second area A2 may maintain the curved shape at a position corresponding to the roller.

The key input device 241 may be disposed on the second side wall 223b or the third side wall 223c of the second structure 202. The electronic device 101 may be designed to exclude the illustrated key input device 241 or include additional key input devices depending on the appearance and the usage state thereof. In some embodiments, the electronic device 101 may include a key input device (not shown), for example, a home key button or a touch pad disposed around the home key button. According to another embodiment, at least a portion of the key input device 241 may be positioned in an area of the first structure 201.

According to various embodiments, the connector hole 243 may be omitted according to embodiments, and may receive a connector (e.g., a USB connector) for transmitting and receiving power and/or data to and from an external electronic device. Although not shown, the electronic device 101 may include a plurality of connector holes 243, and some of the plurality of connector holes 243 may function as connector holes for transmitting and receiving audio signals to and from an external electronic device. Although the connector hole 243 is disposed on the third side wall 223c in the illustrated embodiment, the disclosure is not limited thereto, and the connector hole 243 or a connector hole (not shown) may be disposed on the first side wall 223a or the second side wall 223b.

According to various embodiments, the audio modules 245a, 245b, 247a, and 247b may include speaker holes 245a and 245b or microphone holes 247a and 247b. One of the speaker holes 245a and 245b may be provided as a receiver hole for voice calls, and the other may be provided as an external speaker hole. The microphone holes 247a and 247b may have a microphone provided therein in order to obtain external sound, and in some embodiments, a plurality of microphones may be disposed to detect the direction of sound. In some embodiments, the speaker holes 245a and 245b and the microphone holes 247a and 247b may be implemented as a single hole, or a speaker (e.g., a piezo speaker) may be included without the speaker holes 245a and 245b. According to an embodiment, the speaker hole indicated by reference number "245b" may be disposed in the first structure 201, and may be used as a receiver hole for voice calls, and the speaker hole (e.g., an external speaker hole) indicated by reference number "245a" or the microphone holes 247a and 247b may be disposed in the second structure 202 (e.g., on one of the side surfaces 223a, 223b, and 223c).

The camera module 249 may be provided to the second structure 202, and may photograph a subject in the direction opposite the first area A1 of the display 203. The electronic device 101 may include a plurality of camera modules 249. For example, the electronic device 101 may include a wide-angle camera, a telephoto camera, or a macro camera, and according to an embodiment, the electronic device 101 may include an infrared projector and/or an infrared receiver, thereby measuring a distance to the subject. The camera module 249 may include one or more lenses, an image sensor, and/or an image signal processor. Although not shown, the electronic device 101 may further include a camera module (e.g., a front camera) for photographing a subject in the first area A1 of the display 203. For example, the front camera may be disposed around the first area A1 or in the area overlapping the display 203, and the camera disposed in the area overlapping the display 203 may photograph a subject by passing through the display 203.

According to various embodiments, an indicator (not shown) of the electronic device 101 may be disposed in the first structure 201 or the second structure 202, and may include a light-emitting diode, thereby providing state information of the electronic device 101 in the form of a visual signal. A sensor module (not shown) of the electronic device 101 may produce an electrical signal or data value corresponding to an internal operating state of the electronic device 101 or an external environmental state. The sensor module may include, for example, a proximity sensor, a fingerprint sensor, or a biometric sensor (e.g., an iris/face recognition sensor or an HRM sensor). In another embodiment, at least one of sensor modules, such as a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor, may be further included.

Figure 3:
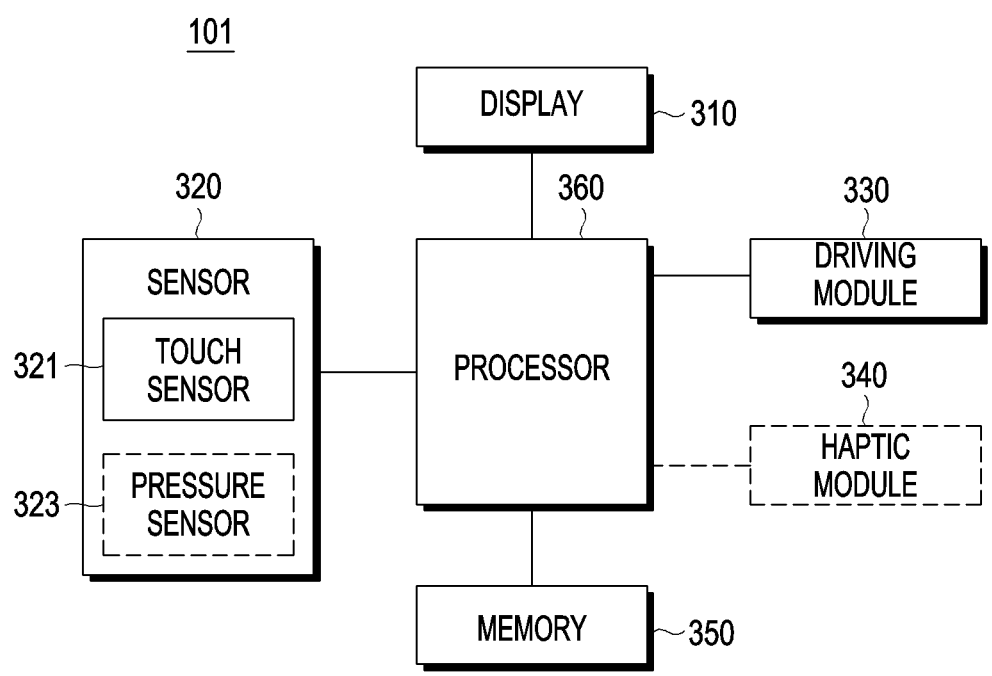
FIG. 3 is a block diagram illustrating an example configuration of an electronic device according to various embodiments.

FIG. 3 is a block diagram illustrating an example configuration of an electronic device 101 according to various embodiments.

Referring to FIG. 3, in an embodiment, the electronic device 101 may include a display 310, a sensor 320, a driving module (e.g., including driving circuitry) 330, a haptic module (e.g., including haptic circuitry) 340, a memory 350, and a processor (e.g., including processing circuitry) 360. In an embodiment, although not shown in FIG. 3, the electronic device 101 may include the first structure 201 and the second structure 202 in FIG. 2, in which the display 310, the sensor 320, the driving module 330, the haptic module 340, the memory, and the processor 360 are disposed.

In an embodiment, the display 310 may be the same as or similar to the display module 160 in FIG. 1 or the display 204 in FIG. 2. For example, the display 310 may include a flexible display including a first area provided in the first surface of the first structure 201 and a second area extending from the first area. The display 310 may be a flexible display in which the second area is at least partially inserted inside the second structure 202 or is visually exposed to the outside of the second structure 202 at one side of the second structure 202 according to the sliding movement of the first structure 201.

In an embodiment, the sensor 320 may be the same as or similar to the sensor module 176 in FIG. 1 or the sensor module (not shown) in FIG. 2.

In an embodiment, the sensor 320 may include a touch sensor 321 capable of detecting a touch by an input tool (e.g., a user's finger or an electronic pen) and a pressure sensor 323 capable of detecting pressure by the touch.

In an embodiment, the touch sensor 321 may detect the position (coordinates) (hereinafter, this may be interchangeably used with "touch coordinates") on the display 310 that an input tool touches. For example, the touch sensor 321 may detect at least one of a touch down position on the display 310 (e.g., a position on the display 310 at which a touch is started or a position at which a touch down event occurs), a position resulting from movement of the touch (e.g., a position detected according to the movement of the touch) after the touch down (e.g., in the state in which the touch down is maintained) (e.g., a position at which an input by drag or swipe is detected or a position at which a touch movement event occurs), or a position at which the touch is released after the touch is moved (also referred to as "touch up" or "touch release"). Hereinafter, touch down, touch movement, and touch release will be collectively referred to as "touch".

In an embodiment, the touch sensor 321 may include a touch sensor using a capacitive method (e.g., a self-capacitive method or a mutual capacitive method). However, the method used by the touch sensor 321 is not limited to the capacitive method, and a pressure-sensitive method (resistive film method), an optical method, an ultrasonic method, or an infrared method may be used.

In an embodiment, the touch sensor 321 may include a sensor capable of detecting pressure by a touch. In an embodiment, the touch sensor using the capacitive method may detect pressure by a touch on the basis of the area by the touch (e.g., the area of the display 310 in which a touch is detected) and/or the amount of change in the area by the touch (e.g., the amount of change in the area by a touch per hour). For example, the touch sensor using the capacitive method may detect the area by a touch, and may determine pressure corresponding to the detected area by the touch (for example, may determine that the larger the area by the touch, the higher the pressure by the touch). In another example, the touch sensor using the capacitive method may detect the amount of change in the area by the touch, and may determine pressure corresponding to the detected amount of change in the area by the touch (for example, may determine that the larger the amount of change in the area by the touch, the higher the pressure by the touch). In an embodiment, the touch sensor using the pressure-sensitive method may detect pressure by a touch. However, the touch sensor 321 capable of detecting pressure by a touch is not limited to the examples described above.

In an embodiment, the touch sensor 321 may be a touch panel. In an embodiment, if the touch sensor 321 is implemented as a sensor capable of detecting pressure (e.g., the strength of pressure or a change in pressure) by a touch in addition to detection of the touch, the electronic device 101 may exclude (or omit) the input sensor 323.

In an embodiment, the pressure sensor 323 may detect pressure by a touch. For example, the pressure sensor 323 may include a capacitive pressure sensor, a resonance pressure sensor, or a piezoelectric pressure sensor. However, the pressure sensor capable of detecting pressure by a touch is not limited to the examples described above.

In an embodiment, the driving module 330 may include various driving circuitry and be implemented to lock the first structure 201 and the second structure 202 or release the locking therebetween, or may be implemented such that the first structure 201 automatically slides while being guided by the second structure 202.

Hereinafter, the driving module 330 will be described in greater detail with reference to FIGS. 4 and 5.

Figure 4:
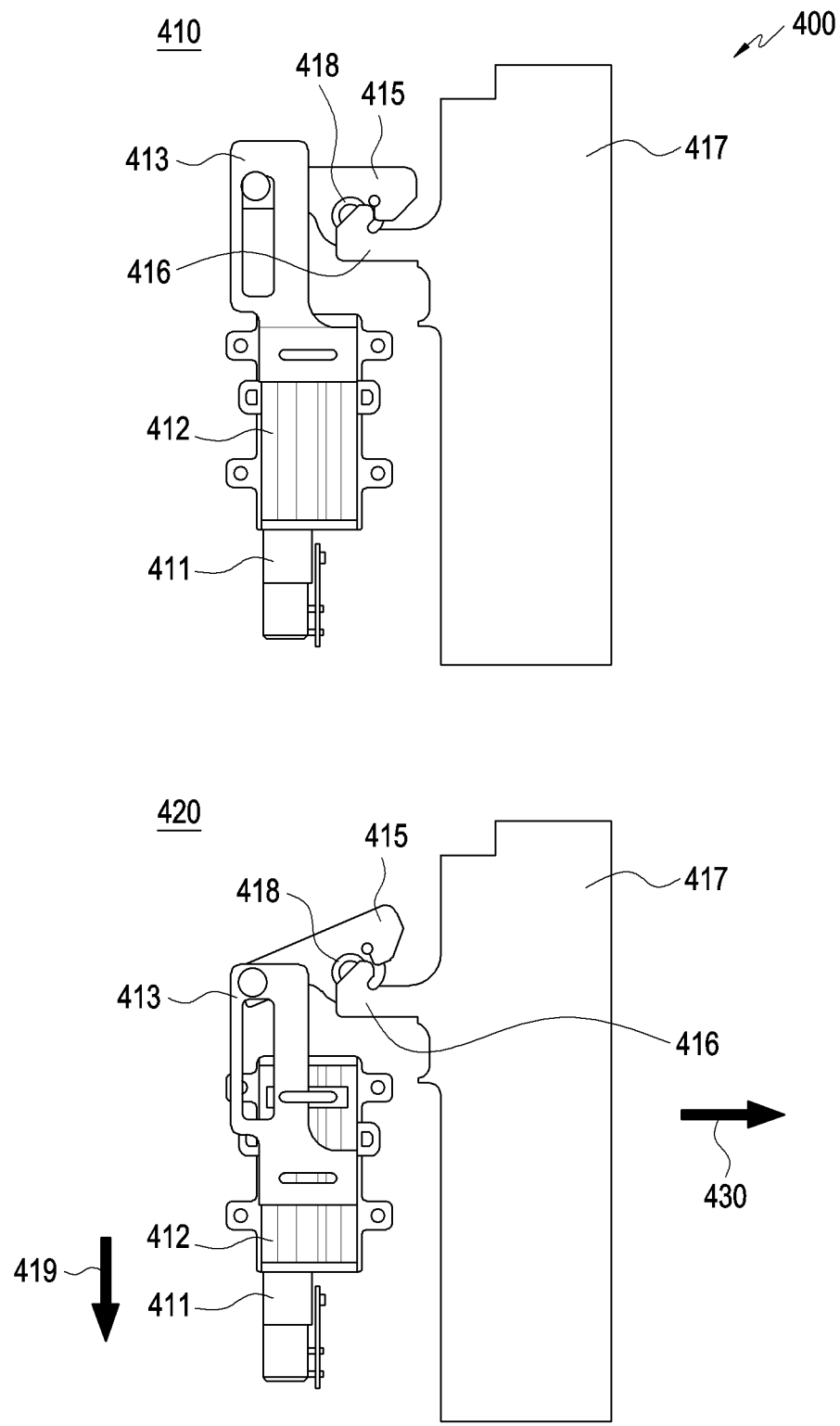
FIG. 4 is a diagram illustrating an example of a driving module capable of locking a first structure and a second structure or releasing the locking therebetween according to various embodiments.

FIG. 4 is a diagram 400 illustrating an example of a driving module 330 capable of locking a first structure 201 and a second structure 202 or releasing the locking therebetween according to various embodiments.

Referring to FIG. 4, in an embodiment, the driving module 330 may include various driving circuitry, a driving motor 411, a coupling member 412, a push rod 413, a locking lever 415, and a hook (clasp) 416.

In an embodiment, the driving motor 411, the coupling member 412, the push rod 413, and the locking lever 415 may be coupled (or fastened) to the second structure 202, and the hook 416 may be coupled to a part 417 of the first structure 201.

In an embodiment, the driving motor 411 may be coupled to the coupling member 412, and the coupling member 411 may be coupled to the push rod 413.

In an embodiment, reference numeral 410 may indicate the locked state of the first structure 201 and the second structure 202 so as to prevent and/or reduce the likelihood of the second structure 202 sliding.

In an embodiment, the driving motor 411 is driven based on a signal received from the processor 360 by, for example, the driving circuitry, thereby releasing the locking between the first structure 201 and the second structure 202. For example, as indicated by reference numeral 420, if the driving motor 411 is driven based on the signal received from the processor 360, the push rod 413 may move in the direction of the arrow 419 (e.g., a linear motion) while being guided by the coupling member 412. When the push rod 413 moves in the direction of the arrow 419, the locking lever 415 may rotate (for example, rotate counterclockwise) around the rotation shaft 418. As the locking lever 415 rotates, the locking between the locking lever 415 and the hook 416 may be released. When the locking between the locking lever 415 and the hook 416 is released, the first structure 201 (e.g., the part 417 of the first structure 201) may be slidable in the direction of the arrow 430.

In an embodiment, when the locking between the first structure 201 and the second structure 202 is released (e.g., when the first structure 201 is in the slidable state), the first structure may slide from the second structure 202 by the force applied by the user. Hereinafter, an example method in which the locking between the first structure 201 and the second structure 202 is released by the driving of the driving motor 411 and in which the first structure 201 slides from the second structure 202 by the force applied by the user may be referred to as a "first method (or manual method)".

Although not shown in FIG. 4, in an embodiment, the driving module 330 may further include a spring (or a spring module) (not shown) providing elastic force in the direction in which the first structure 201 and the second structure 202 draw away from each other. In the case where the driving module 330 further includes the spring, when the lock between the first structure 201 and the second structure 202 is released, the first structure 201 may slide from the second structure 201 by the elastic force of the spring. Hereinafter, a method in which the locking between the first structure 201 and the second structure 202 is released by the driving of the driving motor 411 and in which the first structure 201 slides from the second structure 202 by the spring will be referred to as a "second method (or semi-automatic method)".

Figure 5:
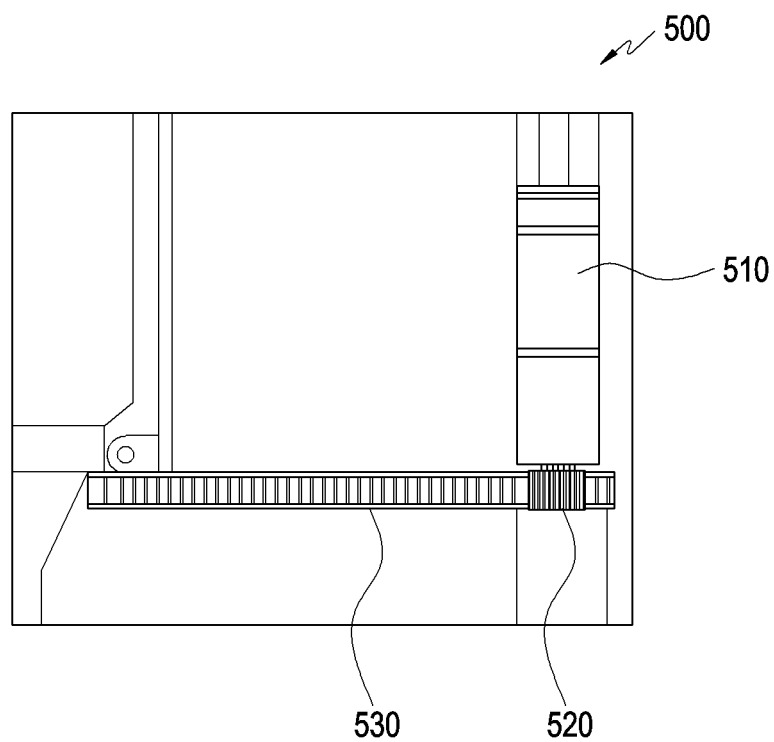
FIG. 5 is a diagram illustrating an example driving module capable of automatically sliding a first structure according to various embodiments.

FIG. 5 is a diagram 500 illustrating an example driving module 300 capable of automatically sliding a first structure 201 according to various embodiments.

Referring to FIG. 5, in an embodiment, the driving module 330 may include a driving motor 510, a motor gear 520, and a gear 530. In an embodiment, the driving motor 510 and the motor gear 520 may be disposed in a second structure (e.g., the second structure 202 in FIG. 2A). In an embodiment, the motor gear 520 may mesh with the gear 530, and may transfer the driving of the driving motor 510 to the gear 530. In an embodiment, the driving motor 510 may rotate the motor gear 520 based on a signal received from a processor (e.g., the processor 360 in FIG. 3).

In an embodiment, gear 530 may include a rack gear. For example, the gear 530 may be disposed on the rear surface of the first plate 211a included in the first structure 201 in FIG. 2A, and may move linearly according to the driving of the driving motor 510, thereby sliding the first plate 211a of the first structure 201. For example, the gear 530 may convert a rotational motion of the driving motor 510 into a linear motion. The gear 530 may move the first plate 211a in a linear direction. Hereinafter, a method in which the first structure 201 slides from the second structure 202 by the driving of the driving motor 510 will be referred to as a "third method (or automatic method)".

Referring back to FIG. 3, in an embodiment, the haptic module 340 may include various haptic circuitry and be the same as or similar to the haptic module 179 in FIG. 1. Embodiments of the operation of the haptic module 340 will be described in greater detail below.

In an embodiment, the memory 350 may be the same as or similar to the memory 130 in FIG. 1. The memory may store a variety of information related to the operation of the electronic device 101, and various pieces of information to be stored in the memory 350 will be described in greater detail below.

In an embodiment, the processor 360 may be the same as or similar to the processor 120 in FIG. 1. The processor 360 may include various processing circuitry and control the overall operation of the electronic device 101. Hereinafter, the operation of the processor 360 will be described in greater detail below.

Although it is illustrated in FIG. 3 that the electronic device 101 includes the display 310, the sensor 320, the driving module 330, the haptic module 340, the memory 350, and the processor 360, the disclosure is not limited thereto. In an embodiment, the electronic device 101 may further include other configurations in addition to the configurations shown in FIG. 3, or may exclude some thereof. For example, the electronic device 101 may further include a communication module (e.g., the communication module 190 in FIG. 1), or may not include at least one of the pressure sensor 323 or the haptic module 340.

An electronic device according to various example embodiments may include: a first structure comprising a reciprocating housing; a second structure including a guide configured to guide sliding movement of the first structure; a flexible display configured to be at least partially received inside the second structure and/or visible to the outside of the second structure based on the sliding movement of the first structure; at least one sensor; and at least one processor operatively connected to the flexible display and the at least one sensor, wherein the at least one processor may be configured to: detect a touch on the flexible display through the at least one sensor, detect pressure of the touch through the at least one sensor, determine whether the direction in which the touch moves corresponds to a direction in which the first structure is capable of sliding, based on the direction in which the touch moves corresponding to the direction in which the first structure is capable of sliding, determine whether a change in the detected pressure satisfies a specified condition, based on determining that the change in the detected pressure satisfies the specified condition, control an operation for the sliding movement of the first structure based on a change in the detected pressure, and based on determining that the change in the detected pressure does not satisfy the specified condition, execute a function of an application corresponding to the touch.

In various example embodiments, the at least one processor may be configured to: identify whether the direction in which the touch moves is included in a specified range of the direction in which the first structure is capable of sliding, and based on the direction in which the touch moves being included in the specified range, determine that the direction in which the touch moves corresponds to the direction in which the first structure is capable of sliding.

In various example embodiments, the at least one processor may be configured to: determine whether the detected pressure is greater than or equal to a threshold pressure, determine whether the touch moves by a specified distance within a specified first time from the time at which the detected pressure is greater than or equal to the threshold pressure, and based on determining that the touch moves by the specified distance within the first time from the time, determine whether the change in the detected pressure satisfies a specified condition.

In various example embodiments, the at least one processor may be configured to control the flexible display to: display information for guiding the touch for the sliding movement of the first structure at the time.

In various example embodiments, the at least one processor may be configured to: based on determining that the touch moves by the specified distance within the first time from the time, calculate a difference between a value obtained by integrating the detected pressure with respect to the position at which the touch is detected and a value obtained by integrating the strength of the threshold pressure with respect to the position where the touch is detected while the touch is moving by the specified distance, and based on the difference being greater than or equal to a specified value, determine that the change in the detected pressure satisfies the specified condition.

In various example embodiments, the at least one processor may be configured to: store, in a memory of the electronic device, information on the touch detected during the time for which the touch moves by the specified distance or during the specified first time from the time, wherein the function corresponding to the detected touch is not executed by the detected touch during the time for which the touch moves by the specified distance or during the specified first time.

In various example embodiments, the at least one processor may be configured to: delete the information on the touch from the memory based on determining that the change in the detected pressure satisfies the specified condition.

In various example embodiments, the at least one processor may be configured to: configure the threshold pressure based on at least one of an executed application, a screen displayed through the flexible display, a function corresponding to a position at which the touch is received, a posture of the electronic device, or an input.

In various example embodiments, the electronic device may further include a driving module comprising driving circuitry, and the at least one processor may be configured to: control the driving module such that locking between the first structure and the second structure is released based on determining that the change in the detected pressure satisfies the specified condition.

In various example embodiments, the electronic device may further include a driving module including driving circuitry, and the at least one processor may be configured to: control the driving module such that the first structure slides based on determining that the change in the detected pressure satisfies the specified condition.

Figure 6:
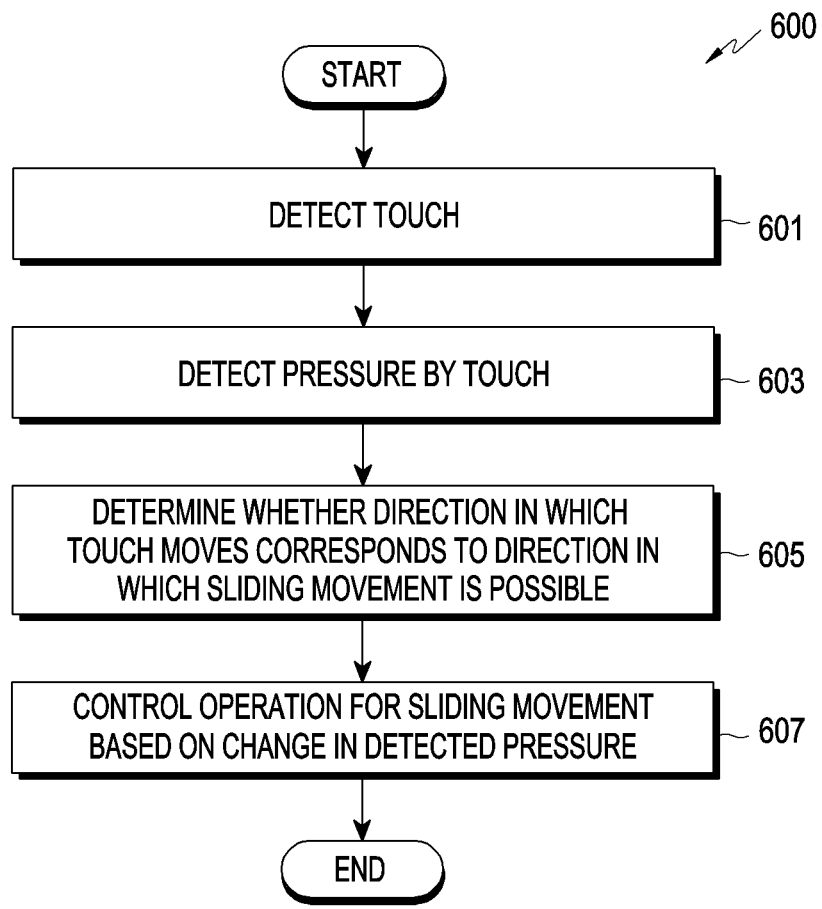
FIG. 6 is a flowchart illustrating an example operation of an electronic device according to various embodiments.

FIG. 6 is a flowchart 600 illustrating example operation of an electronic device 101 according to various embodiments.

Referring to FIG. 6, in an embodiment, the processor 360 may detect a touch through the sensor 320 in operation 601. For example, the processor 360 may detect (or obtain) a position (coordinates) of the touch input from the user through the touch sensor 321.

In an embodiment, the processor 360 may detect, through the touch sensor 321, at least one of a touch down position on the display 310 (e.g., a position on the display 310 at which a touch is started or a position at which a touch down event occurs), a position resulting from movement of the touch (e.g., a position detected according to the movement of the touch) after the touch down (e.g., in the state in which the touch down is maintained) (e.g., a position at which an input by drag or swipe is detected or a position at which a touch movement event occurs), or a position at which the touch is released after the touch is moved (also referred to as "touch up" or "touch release").

In an embodiment, the processor 360 may continuously detect the position of the touch through the touch sensor 321 while the touch is maintained after the touch down and until the touch release.

In an embodiment, when an input by the touch (hereinafter, this will be interchangeably used with a "touch input") is received, the processor 360 may perform a function corresponding to the touch input based on a function of the executed application or the application related to the touch position.

For example, the processor 360 may identify whether the executed application (e.g., a running application or an application running in the foreground) is an application that performs a function immediately after the touch input (e.g., immediately after the touch down or immediately after movement of the touch) or is an application that performs a function after the touch is completed (e.g., after the touch is released). If the executed application is the application that performs a function immediately after the touch input, the processor 360 may immediately perform a function of the application corresponding to the touch input position in response to the touch input. If the executed application is the application that performs a function after the touch is completed (e.g., after the touch is released), the processor 360 may perform a function of the application after the touch is completed.

As another example, the processor 360 may identify whether the function corresponding to the touch position in the executed application is a function of the application that performs a function immediately after the touch input or a function of the application that performs a function after the touch is completed. If the function of the application corresponding to the touch position is the function of the application that performs the function immediately after the touch input, the processor 360 may immediately perform the function of the application corresponding to the touch input position in response to the touch input. If the function of the application corresponding to the touch position is the function of the application that performs the function after the touch is completed, the processor 360 may perform the function of the application after the touch is completed.

In operation 603, in an embodiment, the processor 360 may detect pressure by the touch through the sensor 320. For example, the processor 360 may detect pressure (the strength or magnitude of pressure) by the touch and/or a change in pressure through the pressure sensor 323 while the touch is maintained.

In operation 605, in an embodiment, the processor 360 may determine whether the direction in which the touch moves corresponds to a direction in which sliding movement is possible.

In an embodiment, the direction in which the sliding movement is possible may be the direction in which the electronic device 101 switches from the closed state to the open state. However, the disclosure is not limited thereto, and the direction in which the sliding movement is possible may be the direction in which the electronic device 101 switches from the open state to the closed state.

In an embodiment, if the direction in which the touch moves (e.g., a drag direction or a swipe direction) is included in a specified range of the direction enabling the sliding movement, the processor 360 may determine that the direction in which the touch moves corresponds to the direction enabling the sliding movement.

In an embodiment, if it is determined that the direction in which the touch moves corresponds to the direction in which the sliding movement is possible, the processor 360 may display information for guiding the touch for the sliding movement on the display 310. Hereinafter, a method of displaying the information for guiding the touch for the sliding movement will be described in greater detail below with reference to FIG. 7.

Figure 7:
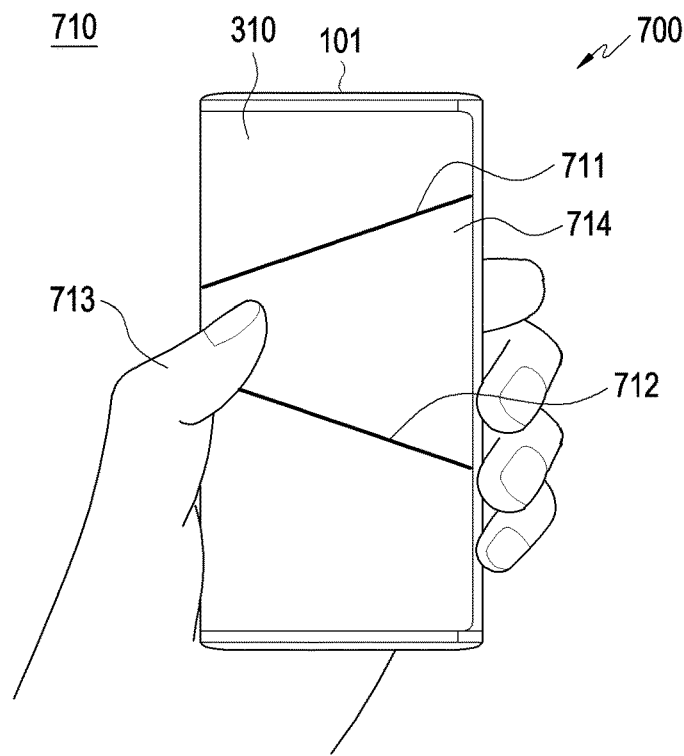
FIG. 7 is a diagram illustrating an example of a method of displaying information for guiding sliding movement according to various embodiments.
Figure 7:
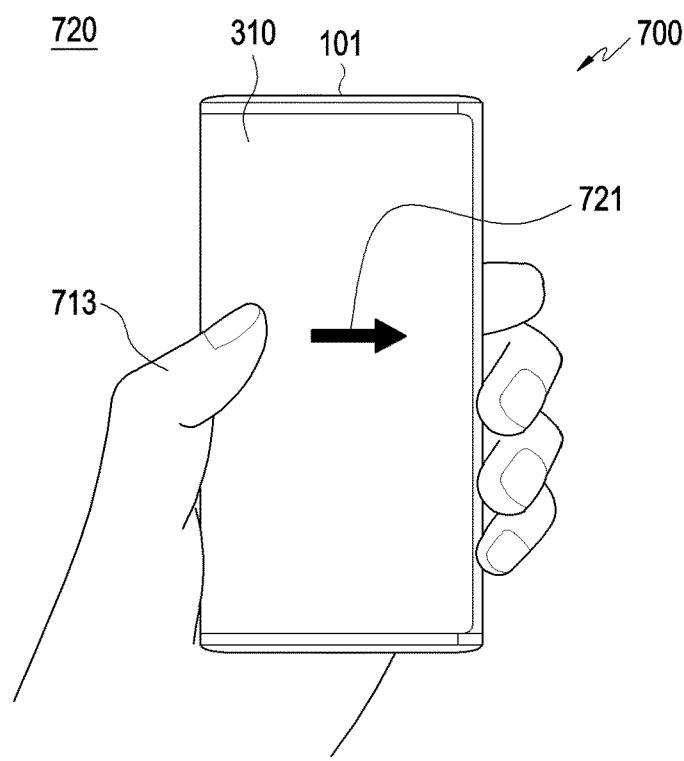

FIG. 7 is a diagram 700 illustrating an example method of displaying information for guiding sliding movement according to various embodiments.

Referring to FIG. 7, in an embodiment, if it is determined that the direction in which the touch moves corresponds to the direction enabling sliding movement, the processor 360, as shown in 710, may display, on the display 310, lines 711 and 712 indicating a specified range of the direction enabling the sliding movement. For example, if it is determined that the direction in which the touch moves corresponds to the direction enabling the sliding movement, the processor 360 may display, on the display 310, the lines 711 and 712 for guiding the user (e.g., a finger 713 of the user) to move the touch in the direction enabling the sliding movement within the area 714 formed by the lines 711 and 712.

In an embodiment, if it is determined that the direction in which the touch moves corresponds to the direction enabling the sliding movement and that the pressure by the touch is greater than or equal to a threshold pressure to be described later, the processor 360 may display information for guiding the touch direction for the sliding movement on the display 310.

In an embodiment, if it is determined that the direction in which the touch moves corresponds to the direction enabling the sliding movement, as shown in 720, the processor 360 may display, on the display 310, an object 721 indicating the direction of the sliding movement for the user (e.g., the finger 723 of the user).

In an embodiment, the processor 360 may specify a range of the direction enabling the sliding movement using a learning or artificial intelligence model. In an embodiment, the processor 360 may collect information on the touch input for the sliding movement from the user for a specified period of time (e.g., about one month). The processor 360 may specify the range of the direction enabling the sliding movement based on the collected information. For example, if a second sliding movement is performed in a direction opposite the direction of a first sliding movement within a specified time after the first sliding movement (e.g., after the electronic device switches from the closed state to the open state) (e.g., if the electronic device switches from the open state to the closed state within a specified time after switching from the closed state to the open state), the processor 360 may collect information on the direction of the touch input for the first sliding movement for a specified period of time. The processor 360 may determine (e.g., update) a specified range such that the direction of the touch input for the first sliding movement falls outside of the specified range of the direction enabling the sliding movement based on the collected information. In an embodiment, the case in which the second sliding movement is performed in the opposite direction of the first sliding movement within a specified time after the first sliding movement according to the direction of the touch input for the first sliding movement may be the case in which the user touches the display 310 in order to execute a function of the application, instead of the sliding movement.

In an embodiment, if a second sliding movement is performed in a direction opposite the direction of a first sliding movement within a specified time after the first sliding movement (e.g., after the electronic device switches from the closed state to the open state) (e.g., if the electronic device switches from the open state to the closed state within a specified time after switching from the closed state to the open state), the processor 360 may collect information on the direction of the touch input for the first sliding movement for a specified period of time. The processor 360 may determine (e.g., update) a specified range such that the direction of the touch input for the first sliding movement falls within the specified range of the direction enabling the sliding movement based on the collected information. In an embodiment, the case in which the second sliding movement is performed in the opposite direction of the first sliding movement within a specified time after the first sliding movement according to the direction of the touch input for the first sliding movement may be the case of touching the display 310 in order to perform the sliding movement, instead of a function of the application.

In an embodiment, the processor 360 may receive, from a server (e.g., the server 108 in FIG. 1), a range of the direction enabling the sliding movement, which is determined by the server using the artificial intelligence model based on information on the touch input received from the electronic device 101 and another electronic device through the communication module 190. The processor 360 may specify the received range of the direction enabling the sliding movement as the range of the direction enabling the sliding movement.

In an embodiment, the processor 360 may specify the range of the direction enabling the sliding movement based on an input, e.g., a user input. For example, the processor 360 may display a screen for specifying the range of the direction enabling the sliding movement on the display 310. The processor 360 may receive touch inputs (e.g., drag inputs or swipe inputs) for specifying the direction enabling the sliding movement a specified number of times from the user. The processor 360 may determine directions capable of forming the largest angle relative to the direction in which the first structure 201 is able to slide (e.g., the directions of the lines 711 and 712) based on the touch inputs. The processor 360 may specify the range of the direction enabling the sliding movement based on the directions.

In an embodiment, the processor 360 may differently specify the range of the direction enabling the sliding movement depending on the position at which the user grips the electronic device 101 or the form in which the user grips the electronic device 101. For example, the processor 360 may differently display, on the display 310, the lines 711 and 712 depending on the position (or area) of the electronic device 101 at which the user's grip on the electronic device 101 is detected or the user's grip form on the electronic device 101 (e.g., right-hand grip, left-hand grip, or both-hands grip).

Although not shown in FIG. 7, the processor 360 may output information for guiding the touch for the sliding movement using various methods, in addition to the methods denoted by 710 and 720. For example, the processor 360 may guide the touch for the sliding movement by outputting specified feedback through the haptic module 340.

Referring back to FIG. 6, in an embodiment, if the direction in which the touch moves does not correspond to the direction enabling the sliding movement, the processor 360 may perform a function of the application corresponding to the direction in which the touch moves, instead of performing an operation for the sliding movement.

In operation 607, in an embodiment, if the direction in which the touch moves corresponds to the direction enabling the sliding movement, the processor 360 may control an operation for the sliding movement of the first structure 201 based on a change in the pressure detected by the touch.

In an embodiment, if it is determined that the direction in which the touch moves corresponds to the direction enabling the sliding movement, the processor 360 may determine whether the pressure detected by the sensor 320 (e.g., the pressure sensor 323) is greater than or equal to a threshold pressure (Hereinafter, referred to as a "threshold pressure").

In an embodiment, the threshold pressure may be determined (e.g., changed) based on at least one of an executed application (or an execution screen of the application), a function corresponding to the touch position, the direction of the electronic device 101 (e.g., horizontal direction or vertical direction), the area of the display 310 in which the touch is input, or a user input. A method of determining the threshold pressure will be described in greater detail below with reference to FIGS. 10 and 11.

In an embodiment, if the detected pressure is less than the threshold pressure, the processor 360 may perform a function by the touch. For example, in the case where an application, performing a function immediately after a touch input, is running (or in the case where the function corresponding to the touch position is a function of the application that performs a function immediately after the touch input), the processor 360 may perform the function of the application corresponding to the touch input immediately after the touch is input while a pressure less than the threshold pressure is detected. As another example, in the case where an application, performing a function after a touch input is completed, is running, the processor 360 may perform a function of the application corresponding to the touch input after the touch is released.

In an embodiment, if the detected pressure is greater than or equal to the threshold pressure, the processor 360 may determine whether the moving distance of the touch is greater than or equal to a specified distance. For example, if it is determined that the detected pressure is greater than or equal to the threshold pressure, the processor 360 may determine whether the amount of change in the position (coordinates) detected by the moving touch (e.g., the touch moving in the direction enabling the sliding movement) is greater than or equal to a specified amount of change.

In an embodiment, if the detected pressure is greater than or equal to the threshold pressure, the processor 360 may determine whether the moving distance of the touch from the position, at which the pressure greater than or equal to the threshold pressure is detected, is greater than or equal to a specified distance within a specified time (hereinafter, referred to as a "specified first time") from the time at which the pressure greater than or equal to the threshold pressure is detected.

In an embodiment, the processor 360 may store information on the position of the moving touch and a touch movement event (e.g., information indicating that movement by the touch occurs) in the memory 350 for the specified first time. The processor 360 may prevent and/or disable the function according to the touch input from being executed for the specified first time even in the case where an application performing a function immediately after the touch input is running (or if the function corresponding to the touch position is a function of the application performing the function immediately after the touch input). Hereinafter, an operation of storing information on the touch position and the touch event in the memory 350 after the touch is input and performing control so as not to execute the function of the application by the touch input may be referred to as "an operation of holding a touch event".

In an embodiment, if the touch moves by a specified distance or more within a specified first time, the processor 360 may hold touch events occurring during the time for which the touch moves by the specified distance so as to be pending. For example, in the case where the touch moves by the specified distance or more within the specified first time, the processor 360 may hold touch events to be pending, which are input during the time for which the touch moves by the specified distance, from the time at which the moving direction of the touch corresponds to the direction enabling the sliding movement and at which the same pressure as the threshold pressure is detected.

In an embodiment, if the touch moves by less than the specified distance within the specified first time, the processor 360 may hold touch events occurring during the specified first time period so as to be pending. For example, in the case where the touch moves by less than the specified distance within the specified first time, the processor 360 may hold touch events to be pending, which are input during the specified first time from the time at which the moving direction of the touch corresponds to the direction enabling the sliding movement and at which the same pressure as the threshold pressure is detected.

In an embodiment, if the moving distance of the touch is less than the specified distance, the processor 360 may perform a function based on the pending touch event without performing the operation for the sliding movement. In an embodiment, if the moving distance of the touch is less than the specified distance, the processor 360 may execute a function of an application based on information on the position of the pending touch, which is stored in the memory 350, and information on the touch event thereof. For example, in the case where an application performing a function immediately after a touch input is running (or if the function corresponding to the touch position is a function of the application that performs the function immediately after the touch input) and where the moving distance of the touch is less than a specified distance, the processor 360 may execute a function of the application corresponding to the pending touch event based on the information on the touch position and the information on the touch event, which are stored in the memory 350, at a specified first time from the time at which a pressure greater than or equal to the threshold pressure is detected. As another example, in the case where an application, performing a function after a touch input is completed, is running and where the moving distance of the touch is less than the specified distance, the processor 360 may execute a function of the application corresponding to the pending touch event based on the information on the touch position and the information on the touch event, which are stored in the memory 350, when the touch is released.

In an embodiment, if the moving distance of the touch is greater than or equal to a specified distance, the processor 360 may determine whether a change in the pressure detected while the touch is moving by the specified distance satisfies a specified condition. Examples of an operation of determining whether a change in the pressure detected while the touch is moving by the specified distance satisfies the specified condition will be described in greater detail below with reference to FIGS. 8, 9A, and 9B.

In an embodiment, if the change in the pressure detected while the touch is moving by the specified distance satisfies the specified condition, the processor 360 may control the operation for the sliding movement.

In an embodiment, if the change in the pressure detected while the touch is moving by the specified distance satisfies the specified condition, the processor 360 may control the operation for the sliding movement using the first method or the second method described above. For example, if the change in the pressure detected while the touch is moving by the specified distance satisfies the specified condition, the processor 360 may release the locking between the first structure 201 and the second structure 202. If the change in the pressure detected while the touch is moving by the specified distance satisfies the specified condition, the processor 360 may control the driving module 330 (e.g., the driving of the driving motor 411) such that the locking between the first structure 201 and the second structure 202 is released. If the locking between the first structure 201 and the second structure 202 is released, the first structure may slide from the second structure 202 by the force applied from the user (e.g., in the case where the driving module 330 is implemented to use the first method) or the elastic force by a spring (e.g., if the driving module 330 is implemented to use the second method).

In an embodiment, if the change in the pressure detected while the touch is moving by the specified distance satisfies the specified condition, the processor 360 may control the operation for the sliding movement using the third method described above. For example, if the change in the pressure detected while the touch is moving by the specified distance satisfies the specified condition, the processor 360 may control the driving module 330 such that the first structure 201 automatically slides from the second structure 202 by the driving of the driving module 330 (e.g., the driving motor 510).

Although it is illustrated in FIG. 6 that the electronic device 101 switches from the closed state to the open state (e.g., the case in which the sliding movement is performed such that the area of the display 310 exposed to the outside slide increases), the disclosure is not limited thereto. In an embodiment, the examples described above may be applied in the same or similarly manner to the case in which the electronic device 101 switches from the open state to the closed state (e.g., the case in which the sliding movement is performed such that the area of the display 310 exposed to the outside slide is reduced). For example, the electronic device 101 may detect a touch using the sensor 320 in the open state. The processor 360 may detect the pressure of the touch through the sensor 320. The processor 360 may determine whether the direction in which the touch moves corresponds to the direction enabling the sliding movement in which the electronic device switches from the open state to the closed state. If the direction in which the touch moves corresponds to the direction enabling the sliding movement, the processor 360 may control the operation for the sliding movement of the first structure 201 based on a change in the detected pressure of the touch.

In an embodiment, the condition of a touch in order for the electronic device 101 to switch from the open state to the closed state (e.g., at least one of the position at which the touch is detected, whether the direction (or angle) in which the touch moves corresponds to the direction enabling the sliding movement, the strength of the threshold pressure, whether the moving distance of a touch, in which a pressure having the strength greater than or equal to the threshold pressure is detected, is greater than or equal to a specified distance, and whether a change in the pressure detected while the touch is moving satisfies a specified condition) may be different from the condition of a touch in order for the electronic device 101 to switch from the closed state to the open state.

Figure 8:
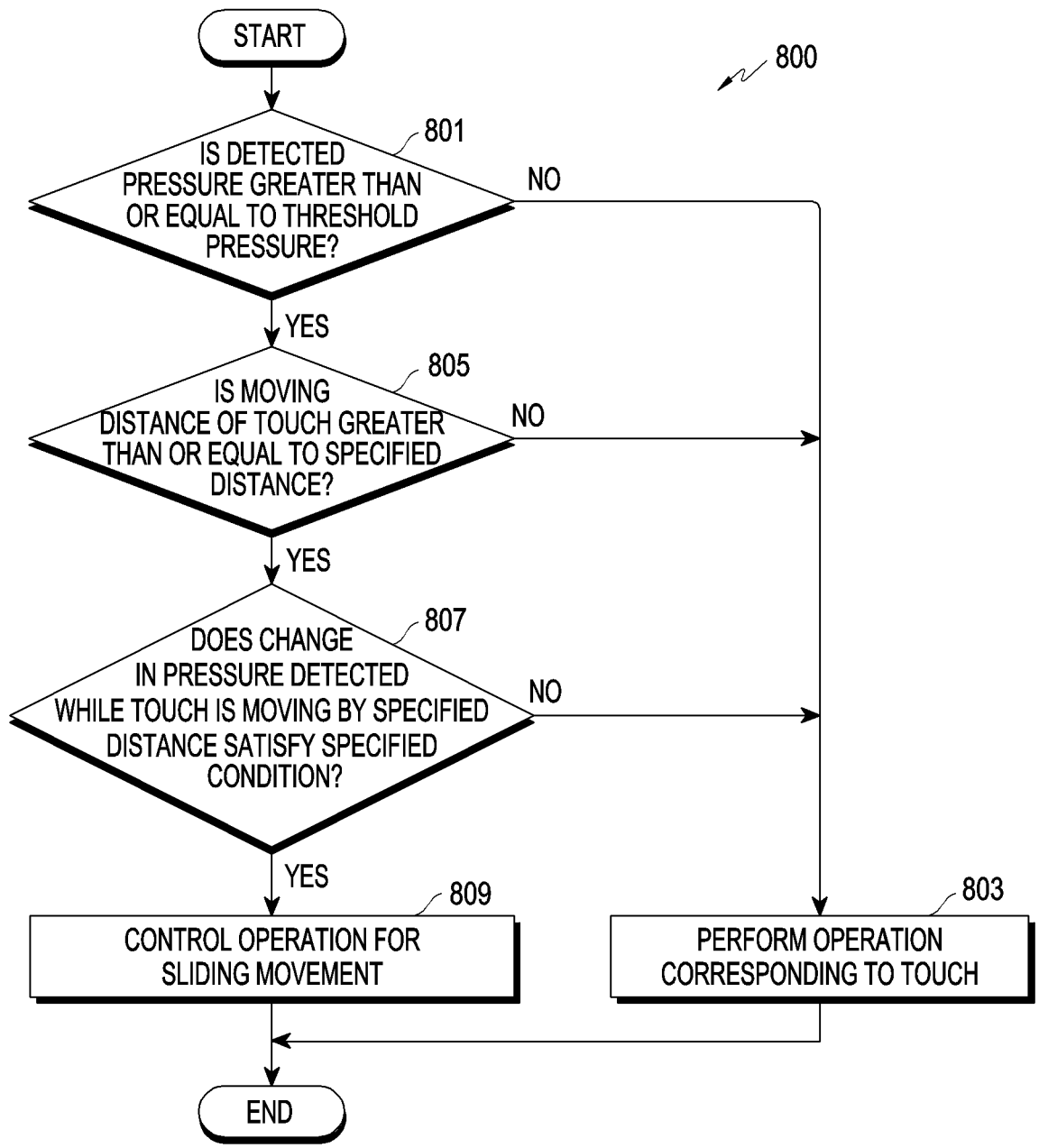
FIG. 8 is a flowchart illustrating an example method of controlling an operation for sliding movement according to various embodiments.

FIG. 8 is a flowchart 800 illustrating an example method of controlling an operation for sliding movement according to various embodiments.

In an embodiment, FIG. 8 may show examples of an operation of controlling the operation for the sliding movement based on the pressure detected in operation 607 in FIG. 6.

Referring to FIG. 8, in an embodiment, the processor 360 may determine whether the detected pressure is greater than or equal to a threshold pressure in operation 801. For example, if it is determined that the direction in which the touch moves corresponds to the direction enabling the sliding movement, the processor 360 may determine whether the pressure detected by the sensor 320 (e.g., the pressure sensor 323) is greater than or equal to the threshold pressure.

If it is determined that the detected pressure is less than the threshold pressure in operation 801 ("No" in operation 801), in an embodiment, the processor 360 may perform an operation corresponding to the touch in operation 803. For example, in the case where an application performing a function immediately after a touch input is running (or if the function corresponding to the touch position is a function of the application that performs the function immediately after the touch input), the processor 360 may immediately perform a function of the application corresponding to the touch input after the touch input while the pressure less than the threshold pressure is detected. As another example, in the case where an application performing a function after a touch input is completed, the processor 360 may perform a function of the application corresponding to the touch input after the touch is released.

If it is determined that the detected pressure is greater than or equal to the threshold pressure in operation 801 ("Yes" in operation 801), in an embodiment, the processor 360 may determine whether the moving distance of the touch is greater than or equal to a specified distance in operation 805. For example, if it is determined that the detected pressure is greater than or equal to the threshold pressure, the processor 360 may determine whether the amount of change in the position (coordinates) detected by the touch (e.g., the touch moving in the direction enabling the sliding movement), which is moved from the position at which the detected pressure is greater than or equal to the threshold pressure, is greater than or equal to a specified amount of change.

In an embodiment, if the detected pressure is greater than or equal to the threshold pressure, the processor 360 may determine whether the moving distance of the touch is greater than or equal to a specified distance within a specified first time from the time at which the pressure equal to or greater than the threshold pressure is detected.

In an embodiment, if the detected pressure is greater than or equal to the threshold pressure, the processor 360 may hold a touch event, which is received from the sensor 320, to be pending after the time at which the moving direction of the touch corresponds to the direction enabling the sliding movement and at which the same pressure as the threshold pressure is detected.

If it is determined that the moving distance of the touch is less than the specified distance in operation 805 ("No" in operation 805), in an embodiment, the processor 360 may perform an operation corresponding to the touch in operation 803. For example, if an application, performing a function immediately after a touch is input, is running, the processor 360 may perform a function of the application corresponding to the touch input immediately after the touch is input while the pressure less than the threshold pressure is detected. As another example, if an application, performing a function after a touch input is completed, is running, the processor 360 may perform a function of the application corresponding to the touch input after the touch is released.

If it is determined that the moving distance of the touch is greater than or equal to the specified distance in operation 805 ("Yes" in operation 805), in an embodiment, the processor 360 may determine whether a change in the pressure detected while the touch is moving by the specified distance satisfies a specified condition in operation 807.

A method of determining whether a change in the pressure detected while the touch is moving by the specified distance satisfies a specified condition will be described in greater detail below with reference to FIGS. 9A and 9B.

Figure 9A:
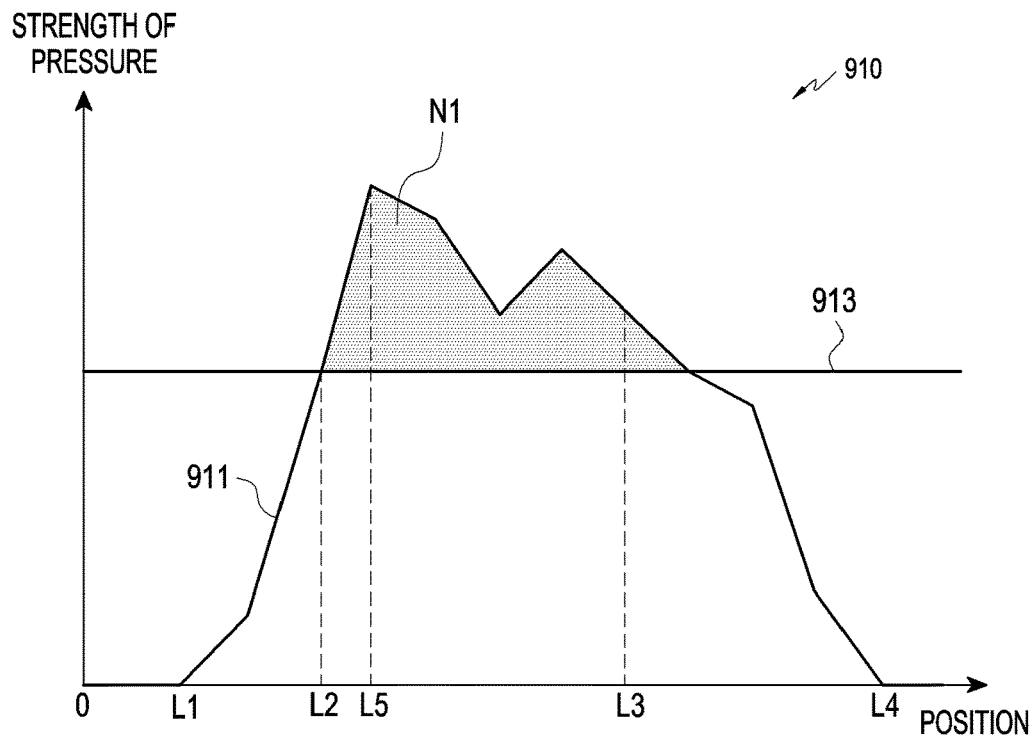
FIG. 9A is a diagram illustrating an example method of determining whether a change in the pressure detected while a touch is moving by a specified distance satisfies a specified condition according to various embodiments.
Figure 9B:
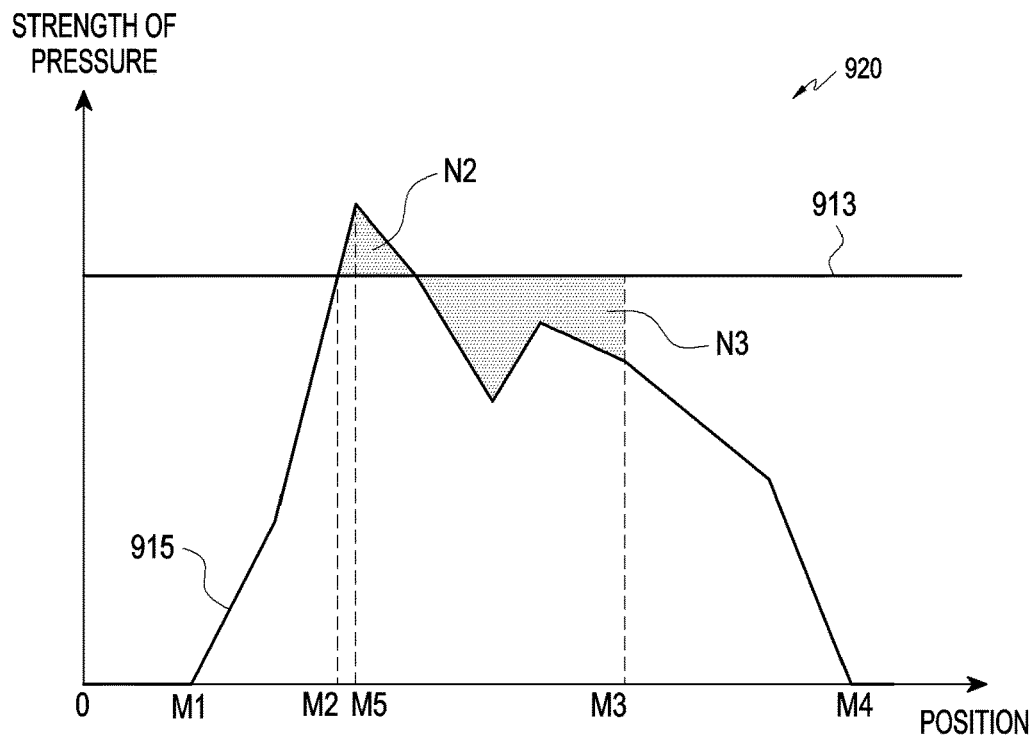
FIG. 9B is a diagram illustrating an example method of determining whether a change in the pressure detected while a touch is moving by a specified distance satisfies a specified condition according to various embodiments.

FIG. 9A is a diagram illustrating an example method of determining whether a change in the pressure detected while a touch is moving by a specified distance satisfies a specified condition according to various embodiments, and FIG. 9B is a diagram illustrating an example method of determining whether a change in the pressure detected while a touch is moving by a specified distance satisfies a specified condition according to various embodiments.

In an embodiment, FIG. 9A is a diagram 910 illustrating the case in which a touch is intended for the sliding movement, and FIG. 9B is a diagram 920 illustrating the case in which a touch is intended to execute an application function by a touch.

In an embodiment, in FIG. 9A, a line 911 may indicate the strength of the pressure detected through the sensor 320 (e.g., the pressure sensor 323) depending on the movement of a touch (e.g., the position detected as a touch moves). A line 913 may indicate the strength of a threshold pressure.

In an embodiment, in FIG. 9A, the position L1 may indicate the position at which pressure by a touch and movement of the touch are detected, and the position L4 may indicate the position at which the touch is released. The position L2 may indicate the position of a touch at which the detected pressure is the same as the threshold pressure. In an embodiment, when a touch is positioned at the position L2 at which the detected pressure is the same as the threshold pressure (from the time at which the touch is positioned there), the processor 360 may start an operation of holding a touch event so as to be pending.

In an embodiment, the processor 360 may determine whether the moving distance of the touch is greater than or equal to a specified distance (e.g., the difference between the position L3 and the position L2) from the position at which the detected pressure is determined to be greater than or equal to the threshold pressure (e.g., the position L2 at which the detected pressure is the same as the threshold pressure).

In an embodiment, the processor 360 may determine whether the moving distance of the touch is greater than or equal to a specified distance (e.g., the difference between the position L3 and the position L2) from the position at which the detected pressure is determined to be greater than or equal to the threshold pressure (e.g., the position L2 at which the detected pressure is the same as the threshold pressure) within a specified first time from the time at which the pressure greater than or equal to the threshold pressure is detected.

In an embodiment, if it is determined that the moving distance of the touch is greater than or equal to the specified distance within the specified first time from the time at which the pressure greater than or equal to the threshold pressure is detected, the processor 360 may determine whether a specified condition is satisfied based on the strength of the pressure detected while the touch is moving by the specified distance and the strength of the threshold pressure. For example, if the difference between the value obtained by integrating the strength of the detected pressure with respect to the position (e.g., with respect to the horizontal axis in FIGS. 9A and 9B) (or according to the position at which the touch is detected) and the value obtained by integrating the strength of the threshold pressure with respect to the position is greater than or equal to a specified value (e.g., 0) (for example, the sign of the difference is "+") while the touch is moving by a specified distance from the position at which a pressure greater than or equal to the strength of the threshold pressure is detected (for example, while the touch is moving from the position L2 to the position L3), the processor 360 may determine that a change in the detected pressure satisfies the specified condition. As another example, if the sum of distances of the positions at which a pressure greater than or equal to the strength of the threshold pressure is detected is greater than or equal to the sum of distances of the positions at which a pressure less than the strength of the threshold pressure is detected while the touch is moving by a specified distance from the position at which a pressure greater than or equal to the strength of the threshold pressure is detected, the processor 360 may determine that a change in the detected pressure satisfies the specified condition. As another example, if the sum of distances of the positions at which a pressure greater than or equal to the strength of the threshold pressure is detected is greater than or equal to a predetermined distance while the touch is moving by a specified distance from the position at which a pressure greater than or equal to the strength of the threshold pressure is detected, the processor 360 may determine that a change in the detected pressure satisfies the specified condition.

In an embodiment, the processor 360, as shown in FIG. 9A, may determine that the difference (e.g., the area N1) between the value obtained by integrating the strength of the detected pressure with respect to the position and the value obtained by integrating the strength of the threshold pressure with respect to the position is greater than or equal to 0 while the touch is moving by a specified distance from the position at which a pressure greater than or equal to the strength of the threshold pressure is detected (for example, while the touch is moving from the position L2 to the position L3), and may determine that a change in the detected pressure satisfies the specified condition.

In an embodiment, in FIG. 9B, the position M1 may indicate the position at which the pressure by a touch and movement of the touch are detected, and the position M4 may indicate the position at which the touch is released. The position M2 may indicate the position of a touch at which the detected pressure is the same as the threshold pressure. In an embodiment, the processor 360 may start an operation of holding a touch event so as to be pending at (or from) the time at which the touch is positioned at the position M2 where the detected pressure is the same as the threshold pressure.

In an embodiment, the processor 360 may determine whether the moving distance of the touch is greater than or equal to a specified distance (e.g., the difference between the position M3 and the position M2) from the position where the detected pressure is determined to be greater than or equal to the threshold pressure (e.g., the position M2 where the detected pressure is the same as the threshold pressure). In an embodiment, the difference between the position L3 and the position L2 in FIG. 9A and the difference between the position M3 and the position M2 in FIG. 9B may be the same as a specified distance.

In an embodiment, the processor 360 may determine whether the moving distance of the touch is greater than or equal to a specified distance (e.g., the difference between the position M3 and the position M2) from the position where the detected pressure is determined to be greater than or equal to the threshold pressure (e.g., the position M2 where the detected pressure is the same as the threshold pressure) within a specified first time from the time at which the pressure greater than or equal to the threshold pressure is detected.

In an embodiment, if it is determined that the moving distance of the touch is greater than or equal to the specified distance within the specified first time from the time at which the pressure greater than or equal to the threshold pressure is detected, the processor 360 may determine whether a specified condition is satisfied based on the strength of the pressure detected while the touch is moving by the specified distance and the strength of the threshold pressure.

In an embodiment, the processor 360, as shown in FIG. 9B, may determine that the difference between the value obtained by integrating the strength of the detected pressure with respect to the position and the value obtained by integrating the strength of the threshold pressure with respect to the position (e.g., the value obtained by subtracting the area N3 from the area N2) is less than 0 while the touch is moving a specified distance (for example, while the touch is moving from the position M2 to the position M3), and may determine that a change in the detected pressure does not satisfy the specified condition.

Although it has been described in FIGS. 9A and 9B that the time of a touch detected at the point L2 or M2 at which the strength of the detected pressure is the same as the threshold pressure is a reference time for a specified first time, that it is determined whether the moving distance of the touch from the position L2 or M2 is greater than or equal to a specified distance, and that it is determined whether a change in the detected pressure satisfies a specified condition based on the position L2 or M2, the disclosure is not limited thereto.

In an embodiment, the processor 360 may determine the time of a touch detected at the position L5 or M5 where the strength of the detected pressure is greater than or equal to the threshold pressure and is maximized to be a reference time for a specified first time. The processor 360 may determine whether the moving distance of a touch is greater than or equal to a specified distance from the position L5 or M5 where the strength of the detected pressure is greater than or equal to the threshold pressure and is maximized. If the difference between the value obtained by integrating the strength of the detected pressure with respect to the position and the value obtained by integrating the strength of the threshold pressure with respect to the position is greater than or equal to 0 while the touch is moving by a specified distance (for example, while the touch is moving by a specified distance from the position L5 or while the touch is moving by a specified distance from the position M5), the processor 360 may determine that the change in the detected pressure satisfies the specified condition.

Referring back to FIG. 8, if the change in the detected pressure does not satisfy the specified condition in operation 807 ("No" in operation 807), in an embodiment, the processor 360 may perform an operation corresponding to the touch in operation 803. For example, if an application, which performs a function immediately after a touch is input, is running (or a function corresponding to the touch position is a function of the application that performs a function immediately after a touch is input) in FIG. 9B, the processor 360 may perform a function of the application corresponding to the pending touch event at the position M3 at which the touch is moved by a specified distance. As another example, if an application that performs a function after completion of a touch input is running, the processor 360 may perform a function of the application corresponding to the touch input after the touch is released.

If the change in the detected pressure satisfies the specified condition in operation 807 ("Yes" in operation 807), in an embodiment, the processor 360 may control an operation for the sliding movement in operation 809.

In an embodiment, if the change in the detected pressure satisfies the specified condition, the processor 360 may delete (or discard or cancel) the pending touch event from the memory 350. In an embodiment, if the change in the detected pressure satisfies the specified condition, the processor 360 may control the operation for the sliding movement using the first method, the second method, or the third method described above.

Figure 10:
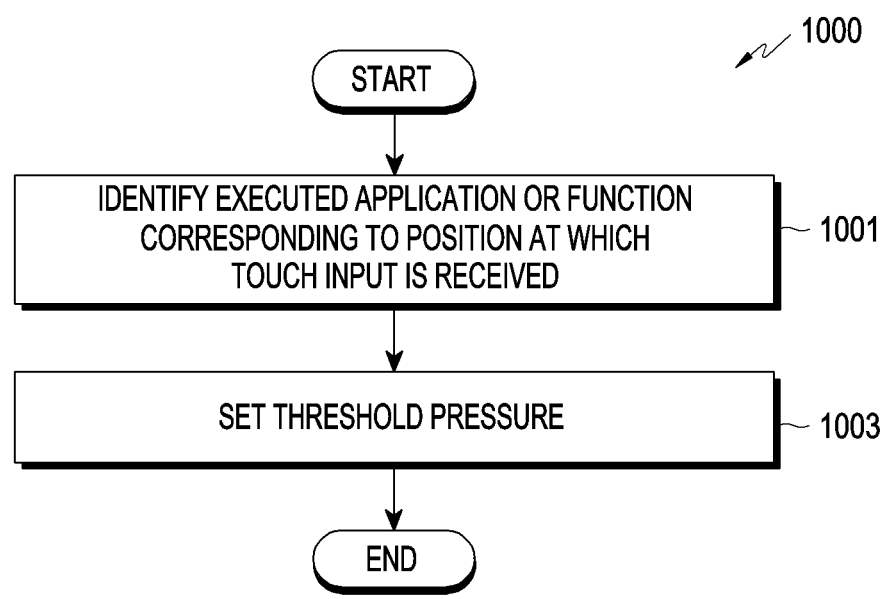
FIG. 10 is a flowchart illustrating an example method of configuring a threshold pressure according to various embodiments.

FIG. 10 is a flowchart 1000 illustrating an example method of configuring a threshold pressure according to various embodiments.

Referring to FIG. 10, in operation 1001, in an embodiment, if a touch input is received, the processor 360 may identify an executed application (e.g., the application running in the foreground or a screen of the executed application) or a function corresponding to the position at which the touch input is received. For example, if a touch is input onto the display 310, the processor 360 may identify the type of an executed application. As another example, if a touch is input onto the display 310, the processor 360 may identify a screen of an executed application. As another example, if a touch is input onto the display 310, the processor 360 may identify a function executed by the touch.

In operation 1003, in an embodiment, the processor 360 may set a threshold pressure based on the executed application (or the screen of the executed application) or the function corresponding to the position at which the touch input is received.

In an embodiment, the processor 360 may differently set the threshold pressure depending on the type of the executed application. For example, the processor 360 may set a threshold pressure of a game application, in which a touch event (e.g., a touch movement event) may occur more frequently than a video application, to be higher than that of the video application.

In an embodiment, the processor 360 may differently set a threshold pressure depending on a screen of the executed application. For example, even if the same application is executed, the processor 360 may set a threshold pressure for a screen, in which a touch event (e.g., a touch movement event) may occur more frequently than other screens, to be higher than those for other screens.

In an embodiment, the processor 360 may differently set a threshold pressure depending on a function corresponding to the position where a touch input is received. For example, the processor 360 may set a threshold pressure for a function executed by a touch movement event to be higher than that for a function executed by a touch down event.

In an embodiment, the processor 360 may set a default threshold pressure, and may set (e.g., adjust) the threshold pressure based on the executed application (or the screen of the executed application) or the function corresponding to the position where the touch input is received. For example, the processor 360 may set a threshold pressure for a game application to be higher than the default threshold pressure, and may set a threshold pressure for a video application to be lower than the default threshold pressure.

Although it has been described in FIG. 10 that the threshold pressure is set based on the executed application (or the screen of the executed application) or the function corresponding to the position where the touch input is received, the disclosure is not limited thereto. In an embodiment, the processor 360 may set a threshold pressure based on the posture (or direction) of the electronic device 101. For example, in the electronic device 101 in which sliding movement to the left and right is possible in a vertical posture (e.g., portrait), the processor 360 may set a threshold pressure for the state in which the electronic device 101 is in a horizontal posture (e.g., landscape) to be lower than that for the state in which the electronic device 101 is in the vertical posture. In an embodiment, the case where the user uses the electronic device 101, enabling sliding movement in the left-right direction in the vertical posture, in the horizontal posture may indicate that the user uses an application with relatively few touch movement events while holding the electronic device 101 with two hands instead of one hand.

Although not shown in FIG. 10, in an embodiment, the processor 360 may set a threshold pressure (e.g., a default threshold pressure) based on a user input. In an embodiment, the processor 360 may differently set a threshold pressure depending on the area of the display 310. A method of configuring the threshold pressure based on a user input, will be described in detail later with reference to FIG. 11, and a method of differently configuring the threshold pressure depending on the area of the display 310 will be described in greater detail below with reference to FIG. 12.

In an embodiment, the processor 360 may set the threshold pressure using a learning or artificial intelligence model. For example, the processor 360 may collect information on a touch input for sliding movement for a specified period of time (e.g., about a month) in relation to at least one of an application (or a screen of the application), a function corresponding to the position where a touch is received, the posture of the electronic device 101, or the area of the display 310. The processor 360 may set a threshold pressure based on the collected information.

For example, the processor 360 may collect information on the strength of pressure of a touch detected for sliding movement during a specified period of time while a first application is running The processor 360 may set the lowest strength of pressure, among the strengths of pressure of the touches detected for sliding movement, which are collected for a specified period of time in relation to the first application, as a threshold pressure.

As another example, the processor 360 may receive, from a server (e.g., the server 108 in FIG. 1) through the communication module 190, a threshold pressure determined by the server using an artificial intelligence model based on the information on the strength of pressure of a touch for sliding movement detected while a first application is running, which is received from the electronic device 101 and another electronic device 101. The processor 360 may set the received threshold pressure as a threshold pressure to be applied to the first application.

Figure 11:
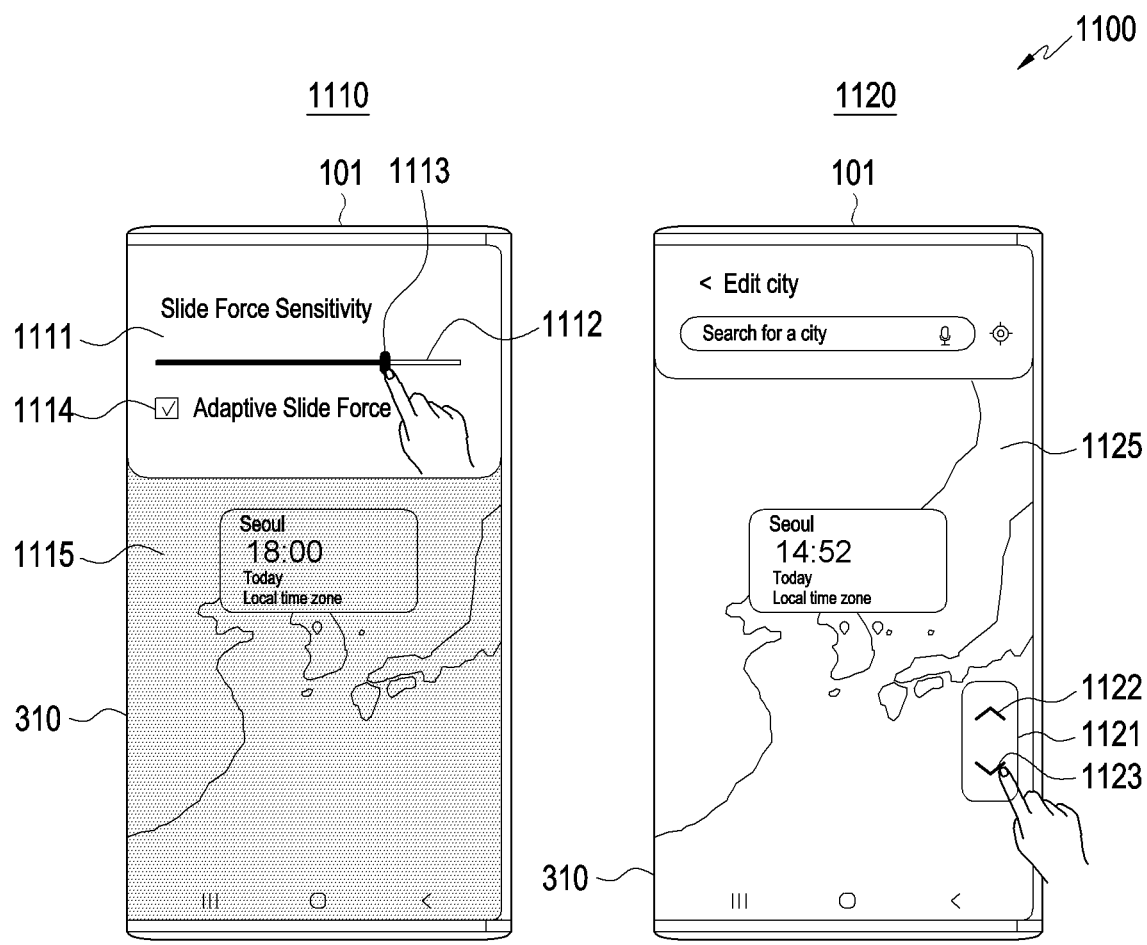
FIG. 11 is a diagram illustrating an example method of configuring a threshold pressure based on a user input according to various embodiments.

FIG. 11 is a diagram 1100 illustrating an example method of configuring a threshold pressure based on a user input according to various embodiments.

In an embodiment, FIG. 11 may show examples of a method in which the processor 360 sets a threshold pressure (e.g., a default threshold pressure) based on a user input.

In an embodiment, the processor 360 may display, on the display 310, a screen for configuring a threshold pressure based on a user input. For example, as denoted by reference number 1110, in response to receiving, from the user, an input moving downward from an uppermost portion of the display 310 while a map application screen 1115 is displayed, the processor 360 may display a window 1111 for configuring a threshold pressure (e.g., a quick panel) on the display 310. In an embodiment, the processor 360 may set (or adjust) a threshold pressure (e.g., a default threshold pressure) according to movement of a slider 1113 on a bar 1112 in the window 1111. In an embodiment, if a user input for an object 1114 is received, the processor 360 may dynamically (or adaptively) change the threshold pressure. For example, if a user input for the object 1114 is received, the processor 360 may dynamically change the default threshold pressure such that the threshold pressure is set to correspond to the map application. As another example, if a user input for the object 1114 is received, the processor 360 may dynamically change the default threshold pressure such that the threshold pressure is set to correspond to an application (or a screen of the application), a function corresponding to the position where the touch is received, the posture of the electronic device 101, or the area of the display 310.

In an embodiment, the processor 360, as denoted by reference number 1120, may display, on the display 310, an object 1121 for configuring a threshold pressure (e.g., the default threshold pressure) based on a user input, while a screen 1125 of the application (e.g., a map application) is displayed. For example, the processor 360 may display the object 1121 on the display 310 in response to reception of a long-press input from the user. The processor 360 may configure a threshold pressure having the strength higher than the strength of a currently set threshold pressure if a user input for the object 1122 is received in the object 1121, and may configure a threshold pressure having the strength lower than the strength of the currently set threshold pressure if a user input for the object 1123 is received in the object 1121.

In an embodiment, the processor 360 may display a screen for configuring the threshold pressure on the display 310. The processor 360 may receive, from the user, a specified number of touch inputs (e.g., drag inputs or swipe inputs) for configuring the threshold pressure. The processor 360 may configure the threshold pressure based on the pressure strengths of a specified number of touch inputs. For example, the processor 360 may configure an average value of the pressure strengths of a specified number of touch inputs as the threshold pressure.

Figure 12:
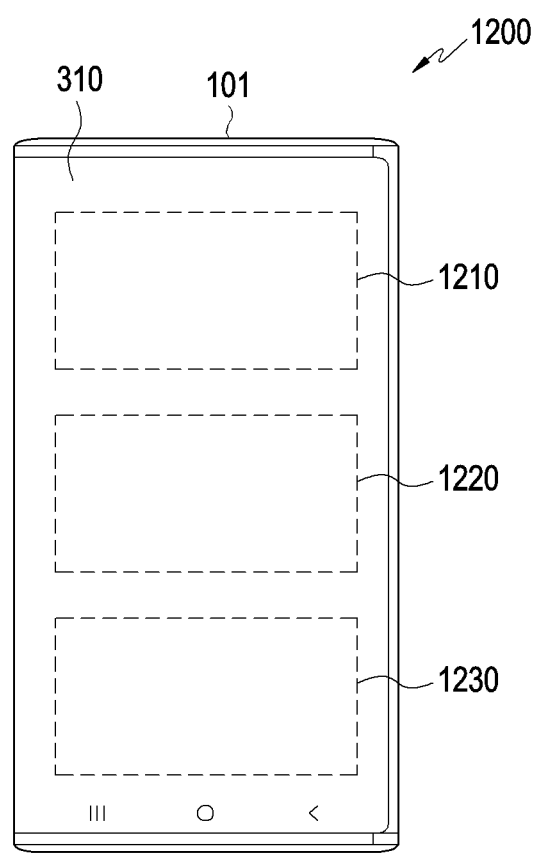
FIG. 12 is a diagram illustrating an example method of configuring a threshold pressure based on an area of a display according to various embodiments.

FIG. 12 is a diagram 1200 illustrating an example method of configuring a threshold pressure based on an area of a display 310, according to various embodiments.

Referring to FIG. 12, in an embodiment, the processor 360 may differently configure a threshold pressure depending on the area of the display 310. For example, the processor 360 may configure a first area 1230 of the display 310 to have a lower threshold pressure than a second area 1220 of the display 310 and a third area 1210 of the display 310, and may configure the second area 1220 of the display 310 to have a lower threshold pressure than the third area 1210 of the display 310. In an embodiment, in the case where the user uses the electronic device 101 while holding the electronic device 101 with one hand, the sliding movement of the first structure 201 from the second structure 202 based on a touch in the first area 1230 of the display 310 may be more frequent than the sliding movement of the first structure 201 from the second structure 202 based on a touch in the second area 1220 and the third area 1210 of the display 310.

In an embodiment, the processor 360 may change (e.g., adjust) the threshold pressures set to correspond to the first area 1230, the second area 1220, and the third area 1210 of the display 310 based on a learning or artificial intelligence model. For example, if the number of times the user slides the first structure from the second structure using a touch in the second area 1220 of the display 310 during a specified period of time is larger than the number of times the user slides the first structure from the second structure using a touch in the first area 1230 of the display 310, the processor 360 may configure the second area 1220 of the display 310 to have a low threshold pressure than the first area 1230 of the display 310.

Although it has been described that the electronic device 101 is in the open state or the closed state in the embodiments described with reference to FIGS. 1 to 12, the disclosure is not limited thereto. In an embodiment, the electronic device 101 may be in an intermediate state between the open state and the closed state. For example, in the case where the first structure 201 is able to slide by a first distance from the second structure 202, the open state of the electronic device 101 may indicate the state in which the first structure 201 is moved by the first distance from the second structure 202. The intermediate state of the electronic device 101 may indicate the state in which the first structure 201 is moved by a distance less than the first distance from the second structure 202.

In an embodiment, in the case where the electronic device 101 is implemented in the third method in which the first structure 201 slides from the second structure 202 by driving of the driving motor 510, if a change in the pressure detected while a touch is moving by a specified distance satisfies the above-described condition (e.g., if the difference between the value obtained by integrating the strength of the detected pressure with respect to the position (e.g., with respect to the horizontal axis in FIGS. 9A and 9B) and the value obtained by integrating the strength of the threshold pressure with respect to the position is greater than or equal to a specified value (e.g., 0) while the touch is moving a specified distance from the position where a pressure greater than or equal to the threshold pressure is detected), the processor 360 may control the driving of the driving motor 510 such that the first structure 201 slides by a distance corresponding to (e.g., proportional to) the value obtained by integrating the detected pressure strength of the touch (e.g., the difference between the value obtained by integrating the detected pressure strength of the touch and the value obtained by integrating the strength of the threshold pressure with respect to the position), for example, such that the electronic device 101 enters the intermediate state.

In an embodiment, if the electronic device 101 switches to the closed state or the open state, the processor 360 may change the screen displayed on the display 310. For example, the processor 360 may display a first screen in the closed state, and may display a second screen different from the first screen in the open state on the display 310.

A method of operating an electronic device according to an example embodiment of the disclosure may include: detecting a touch on a flexible display through at least one sensor of an electronic device including a first structure comprising a reciprocating housing, a second structure including a guide configured to guide sliding movement of the first structure, the flexible display configured to be at least partially received inside the second structure or visible to the outside of the second structure based on the sliding movement of the first structure, and at least one sensor; detecting pressure by the touch through the at least one sensor; determining whether the direction in which the touch moves corresponds to a direction in which the first structure is able to slide; based on the direction in which the touch moves corresponding to the direction in which the first structure is capable of sliding, determining whether a change in the detected pressure satisfies a specified condition; based on determining that the change in the detected pressure satisfies the specified condition, controlling an operation for the sliding movement of the first structure 201 based on a change in the detected pressure; and based on determining that the change in the detected pressure does not satisfy the specified condition, executing a function of an application corresponding to the touch.

In various example embodiments, the determining whether the direction in which the touch moves corresponds to the direction in which the first structure is able to slide may include: identifying whether the direction in which the touch moves is included in a specified range of the direction in which the first structure is able to slide; and based on the direction in which the touch moves being included in the specified range, determining that the direction in which the touch moves corresponds to the direction in which the first structure is able to slide.

In various example embodiments, the determining whether the change in the detected pressure satisfies the specified condition may include: determining whether the detected pressure is greater than or equal to a threshold pressure; determining whether the touch moves by a specified distance within a specified first time from the time at which the detected pressure is greater than or equal to the threshold pressure; and based on determining that the touch moves by the specified distance within the first time from the time, determining whether the change in the detected pressure satisfies the specified condition.

In various example embodiments, the method may further include displaying, on the flexible display, information for guiding the touch for the sliding movement of the first structure at the time.

In various example embodiments, the determining whether the change in the detected pressure satisfies the specified condition may include: based on determining that the touch moves by the specified distance within the first time from the time, calculating a difference between a value obtained by integrating the detected pressure with respect to the position at which the touch is detected and a value obtained by integrating the strength of the threshold pressure with respect to the position where the touch is detected while the touch is moving by the specified distance; and based on the difference being greater than or equal to a specified value, determining that the change in the detected pressure satisfies the specified condition.

In various example embodiments, the method may further include storing, in a memory of the electronic device, information on the touch detected during the time for which the touch moves by the specified distance or during the specified first time from the time, wherein the function corresponding to the detected touch is not executed by the detected touch during the time for which the touch moves by the specified distance or during the specified first time.

In various example embodiments, the method may further include: deleting the information on the touch from the memory based on determining that the change in the detected pressure satisfies the specified condition.

In various example embodiments, the method may further include configuring the threshold pressure based on at least one of an executed application, a screen displayed through the flexible display, a function corresponding to a position at which the touch is received, a posture of the electronic device, or an input.

In various example embodiments, the controlling the operation for the sliding movement of the first structure may include controlling the driving module of the electronic device such that locking between the first structure and the second structure is released based on determining that the change in the detected pressure satisfies the specified condition.

In various example embodiments, the controlling the operation for the sliding movement of the first structure may include controlling the driving module of the electronic device such that the first structure slides based on determining that the change in the detected pressure satisfies the specified condition.

In addition, the structure of the data used in the above-described embodiment may be recorded in a computer-readable recording medium through various means. The computer-readable recording medium includes a storage medium such as a magnetic storage medium (e.g., ROM, a floppy disk, a hard disk, etc.), and an optical reading medium (e.g., CD-ROM, DVD, etc.).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a first structure comprising a reciprocating housing;
   a second structure including a guide configured to guide sliding movement of the first structure;
   a flexible display configured to be at least partially inserted inside the second structure or visible to an outside of the second structure by the sliding movement of the first structure;
   at least one sensor; and
   at least one processor operatively connected to the flexible display and the at least one sensor,
   wherein the at least one processor is configured to:
   detect a touch on the flexible display through the at least one sensor,
   detect pressure of the touch through the at least one sensor,
   determine whether a direction in which the touch moves corresponds to a direction in which the first structure is capable of sliding,
   based on determining that the direction in which the touch moves corresponds to the direction in which the first structure is capable of sliding, determine whether a change in the detected pressure satisfies a specified condition,
   based on determining that the change in the detected pressure satisfies the specified condition, control an operation for the sliding movement of the first structure, and
   based on determining that the change in the detected pressure does not satisfy the specified condition, execute a function of an application corresponding to the touch.

2. The electronic device of claim 1, wherein the at least one processor is configured to:
   identify whether the direction in which the touch moves is included in a specified range of the direction in which the first structure is capable of sliding, and
   based on identifying that the direction in which the touch moves is included in the specified range, determine that the direction in which the touch moves corresponds to the direction in which the first structure is capable of sliding.

3. The electronic device of claim 1, wherein the at least one processor is configured to:
   determine whether the detected pressure is greater than or equal to a threshold pressure,
   determine whether the touch moves by a specified distance within a specified first time from a time at which the detected pressure is greater than or equal to the threshold pressure, and
   based on determining that the touch moves by the specified distance within the specified first time from the time, determine whether the change in the detected pressure satisfies a specified condition.

4. The electronic device of claim 3, wherein the at least one processor is configured to control the flexible display to display information for guiding the touch for the sliding movement of the first structure at the time.

5. The electronic device of claim 3, wherein the at least one processor is configured to:
   based on determining that the touch moves by the specified distance within the specified first time from the time, calculate a difference between a value obtained by integrating the detected pressure with respect to a position at which the touch is detected and a value obtained by integrating the strength of the threshold pressure with respect to the position where the touch is detected while the touch is moved by the specified distance, and
   based on the difference being greater than or equal to a specified value, determine that the change in the detected pressure satisfies the specified condition.

6. The electronic device of claim 3, wherein the at least one processor is configured to:
   store, in a memory of the electronic device, information on the touch detected during a time for which the touch moves by the specified distance or during the specified first time,
   wherein the function corresponding to the detected touch is not executed by the detected touch during the time for which the touch moves by the specified distance or during the specified first time.

7. The electronic device of claim 6, wherein the at least one processor is configured to:
delete the information on the touch from the memory based on determining that the change in the detected pressure satisfies the specified condition.

8. The electronic device of claim 3, wherein the at least one processor is configured to set the threshold pressure based on at least one of an executed application, a screen displayed through the flexible display, a function corresponding to a position at which the touch is received, a posture of the electronic device, or an input.

9. The electronic device of claim 3, further comprising a driving module comprising driving circuitry,
wherein the at least one processor is configured to control the driving module such that locking between the first structure and the second structure is released based on determining that the change in the detected pressure satisfies the specified condition.

10. The electronic device of claim 3, further comprising a driving module comprising driving circuitry,
wherein the at least one processor is configured to control the driving module such that the first structure slides based on determining that the change in the detected pressure satisfies the specified condition.

11. A method of operating an electronic device, the method comprising:
detecting a touch on a flexible display through at least one sensor of the electronic device comprising a first structure comprising a reciprocating housing, a second structure including a slide configured to guide sliding movement of the first structure, the flexible display configured to be at least partially inserted inside the second structure or visible to an outside of the second structure by the sliding movement of the first structure;
detecting pressure of the touch through the at least one sensor;
determining whether a direction in which the touch moves corresponds to a direction in which the first structure is capable of sliding;
based on the direction in which the touch moves corresponding to the direction in which the first structure is capable of sliding, determining whether a change in the detected pressure satisfies a specified condition;
based on determining that the change in the detected pressure satisfies the specified condition, controlling an operation for the sliding movement of the first structure; and
based on determining that the change in the detected pressure does not satisfy the specified condition, executing a function of an application corresponding to the touch.

12. The method of claim 11, wherein the determining whether the direction in which the touch moves corresponds to the direction in which the first structure is capable of sliding comprises:
identifying whether the direction in which the touch moves is included in a specified range of the direction in which the first structure is capable of sliding; and
based on identifying that the direction in which the touch moves is included in the specified range, determining that the direction in which the touch moves corresponds to the direction in which the first structure is capable of sliding.

13. The method of claim 11, wherein the determining whether the change in the detected pressure satisfies the specified condition comprises:
determining whether the detected pressure is greater than or equal to a threshold pressure;
determining whether the touch moves by a specified distance within a specified first time from a time at which the detected pressure is greater than or equal to the threshold pressure; and
based on determining that the touch moves by the specified distance within the specified first time from the time, determining whether the change in the detected pressure satisfies the specified condition.

14. The method of claim 13, further comprising displaying, on the flexible display, information for guiding the touch for the sliding movement of the first structure at the time.

15. The method of claim 13, wherein the determining whether the change in the detected pressure satisfies the specified condition comprises:
based on determining that the touch moves by the specified distance within the specified first time from the time, calculating a difference between a value obtained by integrating the detected pressure with respect to a position at which the touch is detected and a value obtained by integrating the strength of the threshold pressure with respect to the position where the touch is detected while the touch is moved by the specified distance; and
based on the difference being greater than or equal to a specified value, determining that the change in the detected pressure satisfies the specified condition.

16. The method of claim 13, further comprising storing, in a memory of the electronic device, information on the touch detected during a time for which the touch moves by the specified distance or during the specified first time,
wherein the function corresponding to the detected touch is not executed by the detected touch during the time for which the touch moves by the specified distance or during the specified first time.

17. The method of claim 16, further comprising:
deleting the information on the touch from the memory based on determining that the change in the detected pressure satisfies the specified condition.

18. The method of claim 13, further comprising setting the threshold pressure based on at least one of an executed application, a screen displayed through the flexible display, a function corresponding to a position at which the touch is received, a posture of the electronic device, or an input.

19. The method of claim 13, wherein the controlling the operation for the sliding movement of the first structure comprises controlling a driving module of the electronic device, the driving module comprising driving circuitry, such that locking between the first structure and the second structure is released based on determining that the change in the detected pressure satisfies the specified condition.

20. The method of claim 13, wherein the controlling the operation for the sliding movement of the first structure comprises controlling a driving module of the electronic device, the driving module comprising driving circuitry, such that the first structure slides based on determining that the change in the detected pressure satisfies the specified condition.

* * * * *